United States Patent
Terajima et al.

(10) Patent No.: US 6,854,397 B2
(45) Date of Patent: Feb. 15, 2005

(54) FRAME MEMBER WITH TRAVELING RAIL USED IN CONVEYOR SYSTEM AND TRAVELING FRAME ASSEMBLY USING THE SAME

(75) Inventors: Atusi Terajima, Saitama (JP); Motoya Koeda, Saitama (JP); Seiichi Fukazawa, Chiba (JP); Kazuyuki Kobayashi, Saitama (JP); Fukukazu Kato, Tokyo (JP)

(73) Assignee: Yamakyu Chain Co., Ltd., Tokyo (JP)

( * ) Notice: Subject to any disclaimer, the term of this patent is extended or adjusted under 35 U.S.C. 154(b) by 0 days.

(21) Appl. No.: 10/220,294

(22) PCT Filed: Apr. 12, 2001

(86) PCT No.: PCT/JP01/03166

§ 371 (c)(1), (2), (4) Date: Sep. 11, 2002

(87) PCT Pub. No.: WO01/79086

PCT Pub. Date: Oct. 25, 2001

(65) Prior Publication Data

US 2003/0029351 A1 Feb. 13, 2003

(30) Foreign Application Priority Data

Apr. 13, 2000 (JP) .................................. 2000-111734
Apr. 28, 2000 (JP) .................................. 2000-129189

(51) Int. Cl.⁷ ............................................... B61B 3/00
(52) U.S. Cl. ....................... 104/95; 198/841; 52/730.6
(58) Field of Search ..................... 104/95, 165, 93, 104/118, 119, 109, 172.3, 172.1, 107, 94, 88.01; 198/841, 860.1, 746, 736, 738, 890, 465.4, 370.01; 52/730.6, 729.5, 730.1, 731.7, 717.06; 248/68.1, 49, 58; 48/49

(56) References Cited

U.S. PATENT DOCUMENTS

| | | | | |
|---|---|---|---|---|
| 4,524,698 A | * | 6/1985 | Tourtellier et al. | 104/107 |
| 4,603,639 A | * | 8/1986 | Sleep | 104/252 |
| 4,718,349 A | * | 1/1988 | Wahren | 104/165 |
| 4,718,350 A | * | 1/1988 | Jacoby et al. | 104/166 |
| 4,967,897 A | * | 11/1990 | Lachonius et al. | 198/841 |
| 5,042,648 A | | 8/1991 | Garvey | |
| 5,489,020 A | | 2/1996 | Clopton | |
| 5,927,041 A | * | 7/1999 | Sedlmeier et al. | 52/730.1 |
| 6,279,735 B1 | * | 8/2001 | Davidsson et al. | 198/890 |

FOREIGN PATENT DOCUMENTS

| | | |
|---|---|---|
| JP | 47-16172 | 10/1972 |
| JP | 53131679 | 11/1978 |
| JP | 61-75713 | 4/1986 |
| JP | 61127511 | 6/1986 |
| JP | 62140007 | 9/1987 |

(List continued on next page.)

OTHER PUBLICATIONS

English Language Abstract of JP 4–274960.
English Language Abstract of JP 62–140007.
English Language Abstract of JP 47–16172.

(List continued on next page.)

Primary Examiner—Frantz F. Jules
(74) Attorney, Agent, or Firm—Greenblum & Bernstein, P.L.C.

(57) ABSTRACT

A metallic frame member provided for use in a traveling frame assembly, guide rail or receiving rail in a conveyor system. A rear section extends longitudinally of the frame member. A pair of inclined sections are bent in directions in which they extend towards each other from lateral ends of the rear section. A pair of front sections are bent in directions in which they extend from lateral ends of the pair of inclined sections generally in parallel to the rear section. A pair of side sections are bent from lateral ends of the front sections towards the rear section. The rear section and pair of inclined sections define a longitudinal concavity having a generally C-like vertical cross-sectional profile. Each of the side sections are folded back at the free end inside or outside thereof to form a folded portion.

6 Claims, 15 Drawing Sheets

FOREIGN PATENT DOCUMENTS

| JP | 4-274960 | 9/1992 |
| JP | 11-79359 | 3/1999 |
| JP | 3011270 | 12/1999 |
| JP | 2000-73483 | 3/2000 |

OTHER PUBLICATIONS

English Language Abstract of JP 61–127511.

English Language Abstract of JP 11–79359.

English Language Abstract of JP 53–131679.

English Language Abstract of JP 61–75713.

English Language Abstract of JP 3011270.

English Language Abstract of JP 2000–73483.

* cited by examiner (a)

(b)

(c)

(d)

(a)

(b)

FRAME MEMBER WITH TRAVELING RAIL USED IN CONVEYOR SYSTEM AND TRAVELING FRAME ASSEMBLY USING THE SAME

FIELD OF THE INVENTION

The present invention relates to a metallic frame member having fitted thereon a plastic traveling rail usable, for example, as a traveling frame assembly, guide rail, receiving rail or the like in the field of conveyor system, and a traveling frame assembly constructed of the frame for use with a conveyor chain or the like.

BACKGROUND ART

The conventional frame member of the above type is formed from iron or stainless steel. The frame member is formed by bending a steel plate of a suitable thickness and proper length by a press or bender to make a simple long structure, and connecting a plurality of such structures to each other, for example.

The conventional frame member is also formed by an extrusion molding from aluminum. The frame member of this type is advantageous in that it can easily be formed to have any complicated shape as desired.

The traveling rail laid under a conveyor chain is formed by working or extrusion molding, for example. For installing the traveling rail to the frame member, the traveling rail is put on the frame member, and fixed to the latter with a plurality of screws at longitudinal predetermined intervals. Alternatively, as shown in FIG. 16, a traveling rail 50 formed by extrusion molding is fitted onto the flat end of a frame member 51, the traveling rail 50 is caused by its own elastic force to catch the end of the frame member 51, and then the end of the traveling rail 50 is fixed to the frame member 51 with screws.

However, the conventional frame member formed from iron or stainless steel is not advantageous in that it can only have a relatively simple structure. To meet the requirements for an appropriate precision of working and rigidity, the frame member has to be formed from a relatively thick plate material. In this case, however, it is difficult to reduce the weight of the frame member and the manufacturing cost. If the frame member required to have a predetermined precision of working and rigidity has no sufficient precision and rigidity to meet the requirements, a step will possibly take place at the connection between the frame members, with the result that articles being conveyed will cause a noise each time they are moved on the rail, they cannot be conveyed at any constant speed and it will be overturned in some cases.

Further, since the conventional frame member incurs a sharp edge in the process of cutting as the case may be, the workers should always be careful when handling such frame members during work at a site of installation. In the worst case, the workers may possibly be bodily injured seriously by such sharp edges.

Also, when assembling such frame members, bolts and nuts at the guide bracket and connections, protruding from the lateral sides of the frame members not in the worker's field of view as the case may be, will possibly hurt the workers unexpectedly. More particularly, since the guide bracket has to be installed where fixing holes are performed, it is necessary to re-form new fixing holes for alignment with holes in the guide bracket if the performed fixing holes are not correctly aligned with the holes in the guide bracket, which will lead to more time of installation and thus larger costs than estimated.

Furthermore, the frame formed from aluminum by extrusion molding is likely to react with moisture or water in an environment where the conveyor system is in operation to produce aluminum oxide compound, has a structure from which water cannot be drained. So, the remaining water in the conveyor system will decay and be unsanitary. Particularly, the aluminum oxide compound produced in the environment where the conveyor system is in operation is very harmful. In industries of food processing and any other fields of industry, it is not desirable from the sanitary point of view to work in any environment where such harmful substance will possibly take place.

Additionally, when the traveling rail is increasingly abraded, its fasteners such as screws are partially (at the head thereof, for example) exposed to be in contact with the sliding surface of the conveyor chain, which will possibly cause the conveyor chains to abnormally be abraded, conveying speed to be irregular or abnormal sound to take place. Also, in case the frame member is caught by the traveling rail under the own elastic force of the latter, the traveling frame will be dislocated laterally in relation to the frame member in some cases if the elastic force of the traveling rail is not sufficiently large. On the contrary, if the elastic force of the traveling rail is too large, the traveling rail cannot be fitted onto the frame member easily or to a predetermined position as the case may be. In such a case, the convey chains cannot move smoothly, causing heat generation, abnormal abrasion, vibration, noise, etc.

DISCLOSURE OF THE INVENTION

Accordingly, the present invention has an object to overcome the above-mentioned drawbacks of the prior art by providing a frame member having fitted thereon a plastic traveling rail being easy to handle, lightweight, high in precision of working and highly rigid, low in noise and cost, safe, easy to assemble and sanitary, and a traveling frame assembly formed from the frame member.

(1) The above object can be attained by providing a metallic frame member having fitted thereon a plastic traveling rail usable in a traveling frame assembly, guide rail or receiving rail used in a conveyor system, the frame member including:

a rear section extending longitudinally of the frame member;

a pair of inclined sections contiguous to lateral ends of the rear sections and extending in converging directions away from the rear section;

a pair of front sections contiguous to lateral ends of the inclined sections and extending in directions generally parallel to the rear section; and a pair of side sections contiguous to lateral ends of the front sections and extending in parallel directions towards the plane of the rear section;

the rear section and pair of inclined sections defining together a longitudinal concavity having a generally C-like vertical cross-sectional profile; and each of the side sections being folded back at the free end inside or outside thereof;

the traveling rail including a base piece, a catching piece opposite to, and with a predetermined space from the base piece, and a side piece contiguous to and joining the base piece and catching piece to each other at their ends, these pieces defining together a recess between them, and having formed at the free end thereof an engagement projection protruded towards the base piece, the traveling rail being fixed to the frame member with the inner wall of the base piece being put in abutment on the side section of the frame member, inner wall of the catching piece being put in abutment on the folded portion of the side section of the frame member and with the engagement projection being engaged on the end of the folded portion of the side section of the frame member.

In the above frame member, the rear section and pair of inclined sections define together a structure having a generally C-like vertical cross section, the front section and one of the side sections define together the structure having a generally L-like vertical cross section, the C-shaped structure is extended at either end thereof by the L-shaped structure, the L-shaped structures being symmetrical with respect to the C-shaped structure, and the folded end of each side section forms a step for engagement with an engagement projection of a traveling rail. Thus, even in case each of the rear section, inclined sections, front sections and side sections is formed relatively thin, the frame member as whole can have a great strength and rigidity. Therefore, there can be provided a lightweight, high precision-worked frame member.

In addition, the frame member is simple in construction, suitable for mass production and inexpensive. So, it is optimum for use to form a traveling frame assembly, guide rail, receiving rail, etc. used in the conveyor systems.

Because of the above construction, the frame member permits to fix the traveling rail to the traveling-rail receiving portion of the frame member, easily, positively and stably. Also, the frame member is easy to handle and permits to easily replace the traveling rail. Further, the traveling rail is simple in construction, suitable for mass production and thus can be produced at low costs. In addition, no fasteners such as screws are required for fixing the traveling rail to the frame member, and thus, even as the traveling rail is increasingly abraded, there will not possibly take place abnormal abrasion of the conveyor chain, irregular conveying speed, abnormal sound or the like.

Particularly, the traveling rail is designed for fixation to the frame member with the inner wall of the base piece being put into abutment on the side section of the frame member, inner wall of the catching piece being put in abutment on the folded portion of the side section of the frame member and with the engagement projection being engaged on the end of the folded portion of the side section of the frame member. So, the traveling rail fixed to the side section of the frame member will not be likely to be dislocated in a direction perpendicular to the side section of the frame member but can be fixed accurately to the frame member so that the conveyor chain can be moved smoothly with no possibility of heating, abnormal abrasion, vibration or noise. In addition, the traveling rail itself can be maintained stably fixed for a long period without having to forcibly press the frame member. Also, the elasticity of the traveling rail can be set in a wide range and thus the present invention provides a traveling rail fixing mechanism permitting to smoothly fix the traveling rail to the frame member and which is easy to handle.

As the counterpart of the traveling rail, the traveling-rail receiving portion of the frame member consists of an end portion of an elongated strip-shaped side section formed contiguous to a front section of the frame member at a predetermined angle with the front section, and a portion of the side section, formed contiguous to the side-section end portion and folded back towards the front section. So the above traveling-rail receiving portion of the frame member can be designed to have a great strength and rigidity, and thus the frame member can be formed thinner and more lightweight.

The above frame member with the traveling rail (1) should desirably be designed so that when the traveling rail is fitted on the traveling-rail receiving portion of the frame member, the inner wall of the base piece is in close contact with the side section of the frame member, the inner wall of the side piece abuts the bent join between the side section and folded portion of the frame member and the inner wall of the catching piece is in close contact with the folded portion of the frame member.

With this traveling rail fixing mechanism, the traveling rail fixed to the traveling-rail receiving portion of the frame member will not be likely to be dislocated in the direction of the side-section width and in a direction perpendicular to the side section of the frame member but can be fixed accurately and stably to the frame member so that the conveyor chain can be moved smoothly with no possibility of heating, abnormal abrasion, vibration or noise.

In addition, the traveling rail itself can be maintained stably fixed for a long period without having to forcibly press the frame member. Also, the elasticity of the traveling rail can be set in a wide range and thus the present invention provides a traveling rail which can be smoothly fixed to the frame member and which is easy to handle.

Also in the above frame member, through-holes should desirably be formed in the bent join between the rear section and inclined section, that between the inclined section and front section and that between the front section and side section, respectively, to prevent water or other liquid from staying in any concavity defined between the sections.

(2) Also the above object can be attained by providing a metal frame member having fitted thereon a plastic traveling rail usable in a traveling frame assembly, guide rail or receiving rail used in a conveyor system, the frame member including:

a rear section extending longitudinally of the frame member;

a pair of inclined sections contiguous to lateral ends of the rear sections and extending in converging directions away from the rear section;

a pair of front sections contiguous to lateral ends of the inclined sections and extending in directions generally parallel to the rear section; and a pair of side sections contiguous to lateral ends of the front sections and extending in parallel directions towards the plane of the rear section;

the rear section and pair of inclined sections defining together a longitudinal concavity having a generally C-like vertical cross-sectional profile; and each of the side sections in pair being shaped at the free end thereof to be a step or to have a concavity for engagement with a traveling rail;

the traveling rail including a base piece, a catching piece opposite to, and with a predetermined space from the base piece, and a side piece contiguous to and joining the base piece and catching piece to each other at their ends, these pieces defining together a recess between them, at least one of the base piece and catching piece having an engagement projection formed thereon while a traveling-rail receiving portion of the frame member, on which the traveling rail is to be fitted, is formed from an elongated strip-shaped fixing base piece, and the traveling rail designed so that the inner wall of the base piece is put in abutment on the fixing base piece, inner wall of the catching piece is put in abutment on the fixing base piece and the engagement projection is engaged on an engagement step or concavity formed on the fixing base piece.

In the above frame member (2), the rear section and pair of inclined sections define together a structure having a generally C-like vertical cross section, the front section and one of the side sections define together a structure having a generally L-like vertical cross-section, and the C-shaped structure is extended at either end thereof by the L-shaped structure, the L-shaped structures being symmetrical with respect to the C-shaped structure, as in the aforementioned frame member (1), and in addition, each of the side sections in pair is shaped at the free end thereof to be a step or to have a concavity for engagement with a traveling rail. Thus, even in case each of the rear section, inclined sections, front sections and side sections is formed relatively thin, the frame member as whole can have a great strength and rigidity. Therefore, there can be provided a lightweight, high precision-worked frame member.

In addition, the frame member is simple in construction, suitable for mass production and inexpensive. So, it is optimum for use to form a traveling frame assembly, guide rail, receiving rail, etc. used in the conveyor systems.

Also in the above frame member (2), through-holes should desirably be formed in the bent join between the rear section and inclined section, that between the inclined section and front section and that between the front section and side section, respectively, to prevent water or other liquid from staying in any concavity or space defined between the sections.

Because of the above construction (2), the frame member with a traveling rail which includes a metal frame member and a plastic rail fitted onto the metal frame permits to secure the traveling rail to the traveling-rail receiving portion of the frame member easily, positively and stably. Also, the frame member with a traveling rail is easy to handle and permits to easily replace the traveling rail. Further, the traveling rail is simple in construction, suitable for mass production and thus can be produced at low costs. In addition, no fasteners such as screws are required for fixing the traveling rail to the frame member, and thus, even as the traveling rail is increasingly abraded, there will not possibly take place abnormal abrasion of the conveyor chain, irregular conveying speed, abnormal sound or the like.

Particularly, the traveling rail is designed so that the inner wall of the base piece is put in abutment on the fixing base piece, inner wall of the catching piece is put in abutment on the fixing base piece and the engagement projection is engaged on an engagement step or concavity formed on the fixing base piece. So, the traveling rail fixed to the traveling-rail receiving portion of the frame member will not be likely to be dislocated in the direction of the side-section width and in a direction perpendicular to the side section of the frame member but can be fixed accurately to the frame member so that the conveyor chain can be moved smoothly with no possibility of heating, abnormal abrasion, vibration or noise. In addition, the traveling rail itself can be maintained stably fixed for a long period without having to forcibly press the frame member. Also, the elasticity of the traveling rail can be set in a wide range and thus the present invention provides a traveling rail which can be smoothly fixed to the frame member and which is easy to handle.

The traveling-rail receiving portion of the frame member is formed from the elongated strip-shaped fixing base piece. Namely, it can be designed more simply.

In the above frame member with a traveling rail (2), there should desirably be provided a joint member which can be inserted in the longitudinal concavity defined by the rear section and opposite inclined sections of the frame member and has a plurality of internally threaded holes formed therein, and the joint members be secured in the longitudinal concavity of the frame member by tightening screws in the internally threaded holes in the joint member.

In such an embodiment, the frame members can be longitudinally coupled to each other easily, positively and securely. Further, the fasteners such as bolts, nuts or the like will not be exposed at the lateral side of the frame member, and thus the frame member according to the present invention is highly safe.

(3) Also the above object can be attained by providing a traveling frame assembly for use with a conveyor chain or the like used in a conveyor system, including a pair of metallic frame members and coupling clamp means to couple the pair of frame members in parallel and opposite to each other, the frame member including:

a rear section extending longitudinally of the frame member;

a pair of inclined sections contiguous to lateral ends of the rear sections and extending in converging directions away from the rear section;

a pair of front sections contiguous to lateral ends of the inclined sections and extending in directions generally parallel to the rear section; and a pair of side sections contiguous to lateral ends of the front sections and extending in parallel directions towards the plane of the rear section;

the rear section and pair of inclined sections defining together a longitudinal concavity having a generally C-like vertical cross-sectional profile;

the coupling clamp means including a pair of clamp bodies and a fastener to couple the clamp bodies and fasten them towards each other; and each of the clamp bodies in pair having provided at either free end thereof an engagement portion shaped to catch each of the rear sections of the frame members.

In the above traveling frame assembly (3), even in case each of the sections of each frame member is formed relatively thin, the frame member as whole can have a great strength and rigidity. So, there can be provided a lightweight, high precision-worked frame member, and in addition the frame member can be simple in construction, suitable for mass production and inexpensive. Therefore, a traveling frame assembly can be provided in which no step is likely to take place at the connection between the frame members. Thus, the traveling frame assembly works quiet with low noise, without irregular conveyance speeds and with no possibility that an article being conveyed will be overturned.

In addition, the traveling frame assembly is simple in construction, suitable for mass production, easy to assemble and inexpensive. So, it is optimum for use in the conveyor systems.

More particularly, the coupling clamp means include the clamp bodies in pair and the fastener to couple the clamp bodies and fasten them towards each other, and each of the clamp bodies in pair has provided at either free end thereof the engagement portion shaped to catch each of the rear sections of the frame members in pair. Thus, the pair of frame members can be coupled to each other simply, positively and securely by the coupling clamp means. The coupling clamp means fasten together the frame members and serve as a distance space for the pair of frame members. Thus a high precision-worked traveling frame assembly can be provided. Therefore, a conveyor chain or the like can easily be installed to the traveling frame assembly which will prevent the conveyor chain from moving laterally.

In the above traveling frame assembly (3), there should desirably be provided a joint member which can be inserted in the longitudinal concavity defined by the rear section and opposite inclined sections of the frame member and has a plurality of internally threaded holes formed therein, and the joint members be secured in the longitudinal concavity of the frame member by tightening screws in the internally threaded holes in the joint member.

In the traveling frame assembly, the frame members can be longitudinally coupled to each other easily, positively and securely. Further, the fasteners such as bolts, nuts or the like will not be exposed at the lateral side of the frame member, and thus the traveling frame assembly according to the present invention is highly safe.

(4) Also the above object can be attained by providing a traveling rail fixing mechanism for fixing a synthetic resin-made traveling rail to a frame member such as a traveling rail assembly, guide rail, receiving rail or the like used in a conveyor system, wherein:

the traveling rail includes a base piece, a catching piece opposite to, and with a predetermined space from, the base piece, and a side piece contiguous to and joining the base piece and catching piece to each other at their ends, these pieces defining together a recess between them;

the traveling rail has formed at the free end thereof an engagement projection protruded towards the base piece, while a traveling-rail receiving portion of a frame member, on which the traveling rail is to be fitted, includes an end portion of an elongated strip-shaped side section formed contiguous to a front section of the frame member at a predetermined angle with the front section, and a portion of the side section, formed contiguous to the side-section end portion and folded back towards the front section; and the traveling rail is fixed to the frame member with the inner wall of the base piece being put in abutment on the side section of the frame member, inner wall of the catching piece being put in abutment on the folded portion of the side section of the frame member and with the engagement projection being engaged on the end of the folded portion of the side section of the frame member.

Because of the above construction, the traveling rail fixing mechanism permits to fix the traveling rail to the frame member, more particularly, to the traveling-rail receiving portion of the latter, easily, positively and stably. Also, the traveling rail fixing mechanism is easy to handle and permits to easily replace the traveling rail. Further, the traveling rail is simple in construction, suitable for mass production and thus can be produced at low costs. In addition, no fasteners such as screws are required for fixing the traveling rail to the frame member, and thus, even as the traveling rail is increasingly abraded, there will not possibly take place abnormal abrasion of the conveyor chain, irregular conveying speed, abnormal sound or the like.

Particularly, the traveling rail is designed for fixation to the frame member with the inner wall of the base piece being put into abutment on the side section of the frame member, inner wall of the catching piece being put in abutment on the folded portion of the side section of the frame member and with the engagement projection being engaged on the end of the folded portion of the side section of the frame member. So, the traveling rail fixed to the side section of the frame member will not be likely to be dislocated in a direction perpendicular to the side section of the frame member but can be fixed accurately to the frame member so that the conveyor chain can be moved smoothly with no possibility of heating, abnormal abrasion, vibration or noise. In addition, the traveling rail itself can be maintained stably fixed for a long period without having to forcibly press the frame member. Also, the elasticity of the traveling rail can be set in a wide range and thus the present invention provides a traveling rail fixing mechanism permitting to smoothly fix the traveling rail to the frame member and which is easy to handle.

As the counterpart of the traveling rail, the traveling-rail receiving portion of the frame member consists of an end portion of an elongated strip-shaped side section formed contiguous to a front section of the frame member at a predetermined angle with the front section, and a portion of the side section, formed contiguous to the side-section end portion and folded back towards the front section. So the above traveling-rail receiving portion of the frame member can be designed to have a great strength and rigidity, and thus the frame member can be formed thinner and more lightweight.

The above traveling rail fixing mechanism (4) should desirably be designed so that when the traveling rail is fitted on the traveling-rail receiving portion of the frame member, the inner wall of the base piece is in close contact with the side section of the frame member, the inner wall of the side piece abuts the bent joint between the side section and folded portion of the frame member and the inner wall of the catching piece is in close contact with the folded portion of the frame member.

With this traveling rail fixing mechanism, the traveling rail fixed to the traveling-rail receiving portion of the frame member will not be likely to be dislocated in the direction of the side-section width and in a direction perpendicular to the side section of the frame member but can be fixed accurately and stably to the frame member so that the conveyor chain can be moved smoothly with no possibility of heating, abnormal abrasion, vibration or noise.

In addition, the traveling rail itself can be maintained stably fixed for a long period without having to forcibly press the frame member. Also, the elasticity of the traveling rail can be set in a wide range and thus the present invention provides a traveling rail which can be smoothly fixed to the frame member and which is easy to handle.

(5) Also the above object can be attained by providing a traveling rail fixing mechanism for fixing a synthetic resin-made traveling rail to a frame member such as a traveling rail assembly, guide rail, receiving rail or the like used in a conveyor system, wherein:

the traveling rail includes a base piece, a catching piece opposite to, and with a predetermined space from, the base piece, and a side piece contiguous to and joining the base piece and catching piece to each other at their ends, these pieces defining together a recess between them, at least one of the base piece and catching piece having an engagement projection formed thereon while a traveling-rail receiving portion of the frame member, on which the traveling rail is to be fitted, is formed from an elongated strip-shaped fixing base piece; and the traveling rail is designed so that the inner wall of the base piece is put in abutment on the fixing base piece, inner wall of the catching piece is put in abutment on the fixing base piece and the engagement projection is engaged on an engagement step or concavity formed on the fixing base piece.

Because of the above construction, the traveling rail fixing mechanism permits to secure the traveling rail to the traveling-rail receiving portion of the frame member easily, positively and stably. Also, the traveling rail fixing mechanism is easy to handle and permits to easily replace the traveling rail. Further, the traveling rail is simple in construction, suitable for mass production and thus can be produced at low costs. In addition, no fasteners such as screws are required for fixing the traveling rail to the frame member, and thus, even as the traveling rail is increasingly abraded, there will not possibly take place abnormal abrasion of the conveyor chain, irregular conveying speed, abnormal sound or the like.

Particularly, the traveling rail is designed so that the inner wall of the base piece is put in abutment on the fixing base piece, inner wall of the catching piece is put in abutment on the fixing base piece and the engagement projection is engaged on an engagement step or concavity formed on the fixing base piece. So, the traveling rail fixed to the traveling-rail receiving portion of the frame member will not be likely to be dislocated in the direction of the side-section width and in a direction perpendicular to the side section of the frame member but can be fixed accurately to the frame member so that the conveyor chain can be moved smoothly with no possibility of heating, abnormal abrasion, vibration or noise. In addition, the traveling rail itself can be maintained stably fixed for a long period without having to forcibly press the frame member. Also, the elasticity of the traveling rail can be set in a wide range and thus the present invention provides a traveling rail which can be smoothly fixed to the frame member and which is easy to handle.

The traveling-rail receiving portion of the frame member is formed from the elongated strip-shaped fixing base piece. Namely, it can be designed more simply.

BEST MODE FOR CARRYING OUT THE INVENTION

Through the accompanying drawings, the frame member according to the present invention is indicated with a reference A. The frame member A is used as a traveling frame assembly, guide rail, receiving rail or the like used in a conveyor system. It is formed from an elongated rectangular steel plate to have desired dimensions and shape for any intended purpose, for example.

As shown, the frame member A consists of a rear section $3a$ extending longitudinally of the frame member A and having a predetermined width and a length larger than the width, a pair of inclined sections $3b$ contiguous to lateral ends of the rear section $3a$ and extending in converging directions away from the rear section $3a$, the rear section $3a$ and pair of inclined sections $3b$ defining together a structure having a generally C-like vertical cross section, a pair of front sections $3c$ contiguous to lateral ends of the inclined sections $3b$ and extending in directions generally parallel to the rear section $3a$, and a pair of side sections $3d$ contiguous to lateral ends of the front sections $3c$ and extending in parallel directions towards the plane of the rear section $3a$, the front section $3c$ and side section $3d$ defining together a structure having a generally L-like vertical cross-section.

Figure 1:
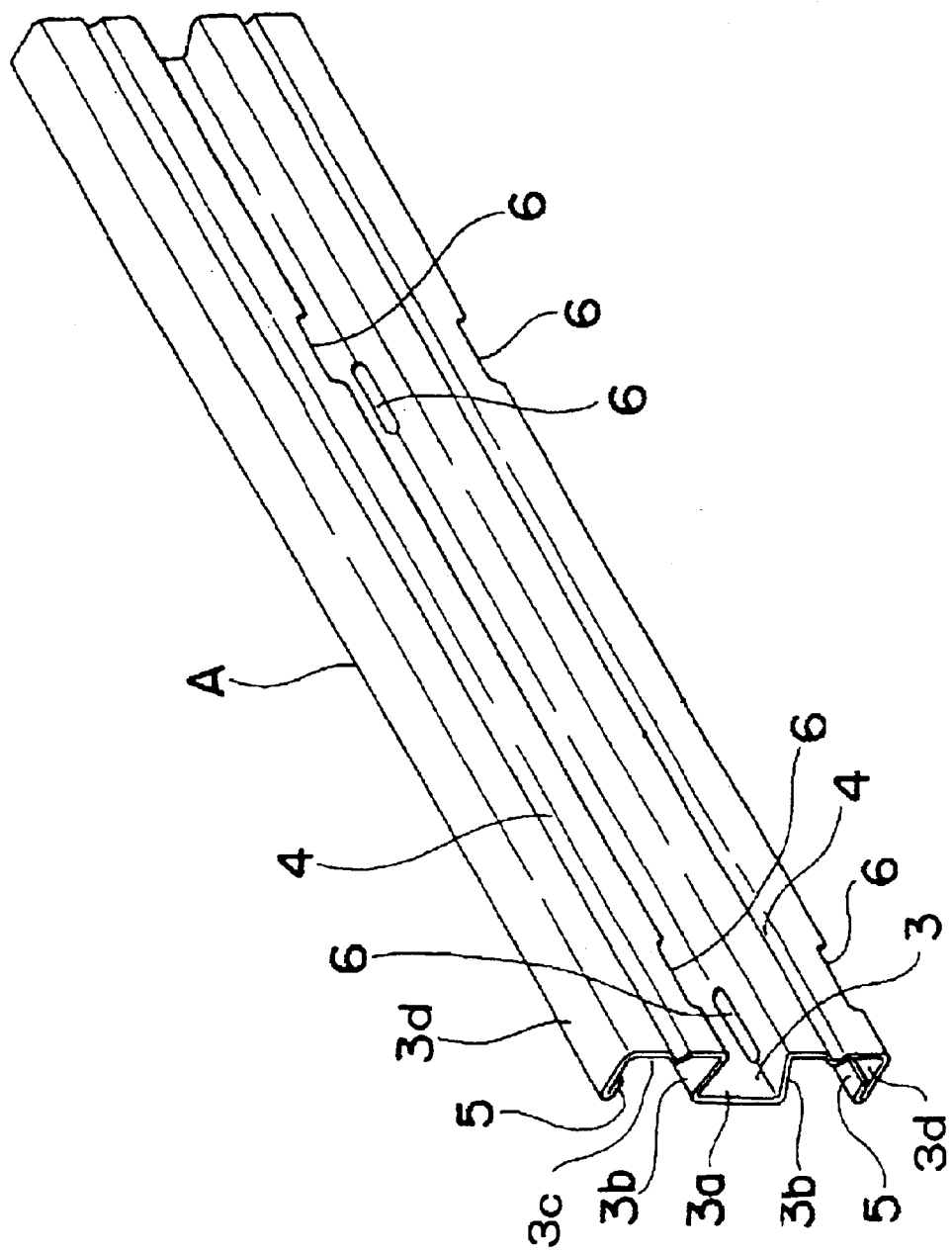
FIG. 1 is a partial perspective view of one embodiment of the frame member employed in the present invention.
Figure 2:
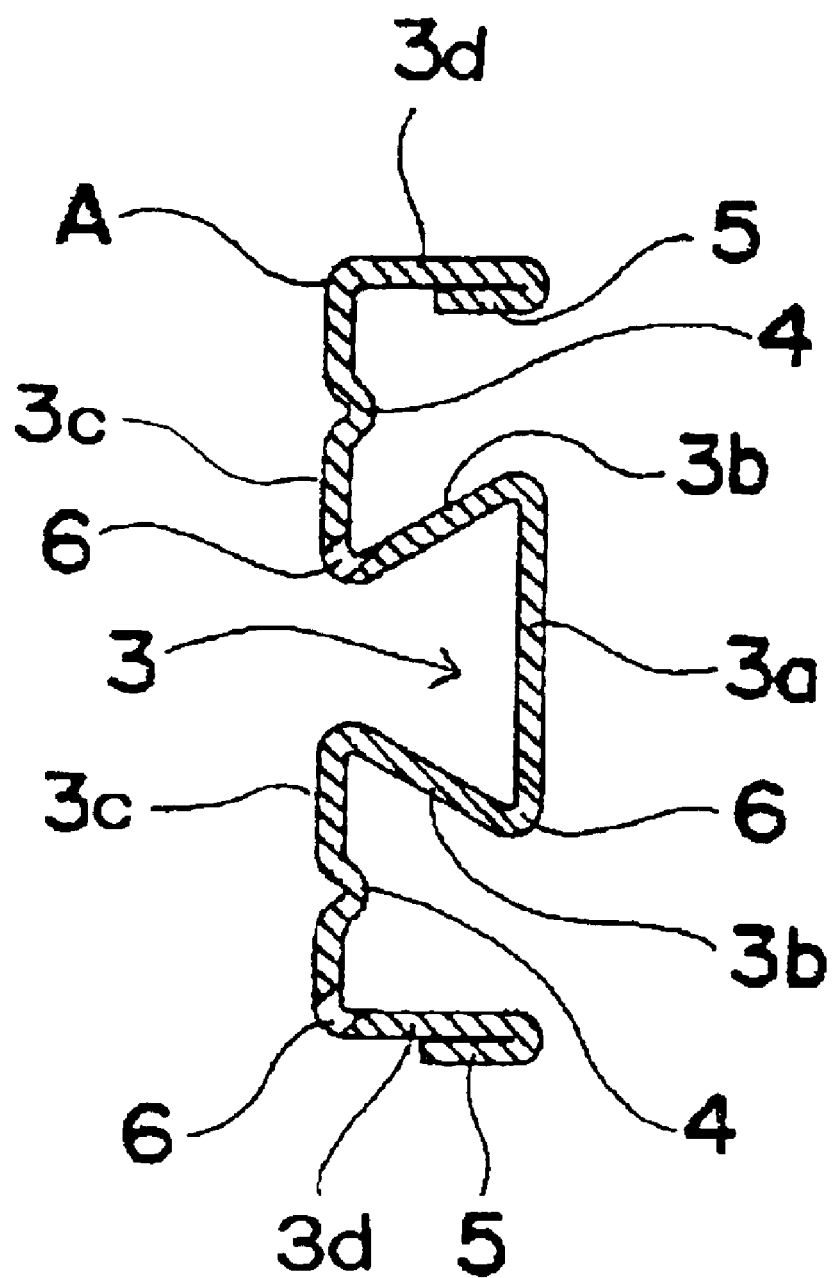
FIG. 2 is an axial-sectional view of another embodiment of the frame member employed in the present invention.
Figure 3:
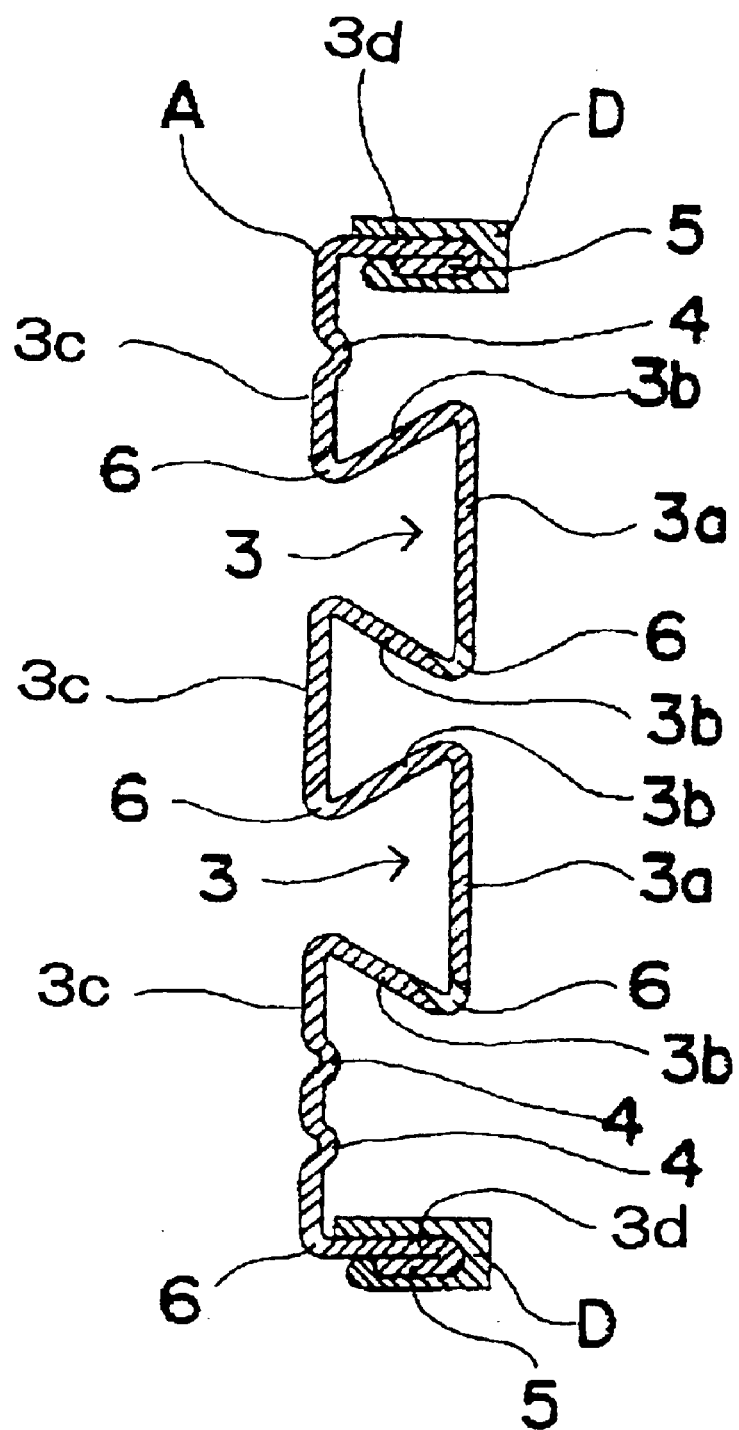
FIG. 3 is also an axial-sectional view of still another embodiment of the frame member employed in the present invention.

The space defined by the rear section $3a$ and pair of inclined sections $3b$ is a longitudinal concavity 3 having a generally C-like vertical cross-section. The concavity 3 is shaped to have an opening whose size is more than a bolt and nut can be inserted through it. For example, one such concavity 3 may be formed longitudinally in the middle of the frame member A (as shown in FIGS. 1 and 2), or more than one such concavity 3 may be formed longitudinally of the frame member A at predetermined lateral intervals (as shown in FIG. 3).

Each of the front sections $3c$ is depressed, as indicated with a reference 4, longitudinally thereof towards the plane of the rear section $3a$. Each of the side sections $3d$ is folded back at the free end inside or outside thereof to form a folded portion 5.

The above depression 4 has a circular vertical cross section. More than one such depression 4 may be formed in predetermined places on the front section $3c$ as necessary (as will be seen from FIG. 3). It should be noted that the depression 4 may not always be formed longitudinally of the front section $3c$ and its vertical cross section may have any from other than circular.

Further, the folded portion 5 is shaped narrower than the side section $3d$. Both the folded portions 5 may be formed by folding back the side section 3d at the free end inside thereof as shown in FIG. 1 or one of them may be formed by folding back the side section 3d at the free end inside thereof while the other be formed by folding back the side section 3d at the free end outside thereof as shown in FIGS. 2 and 3.

Figure 4:
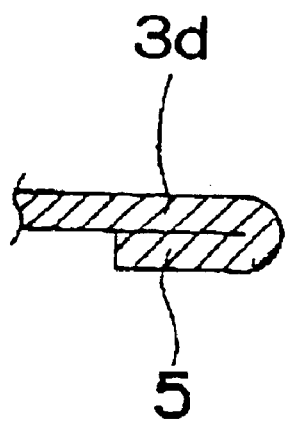
FIGS. 4(a) to 4(d) are partial sectional views of variants of the folded portion of the frame member employed in the present invention.
Figure 4:
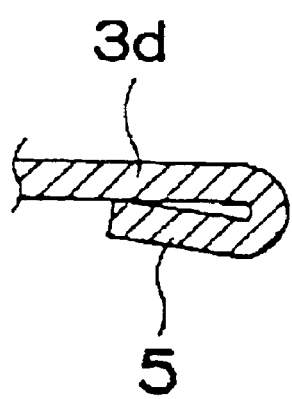
Figure 4:
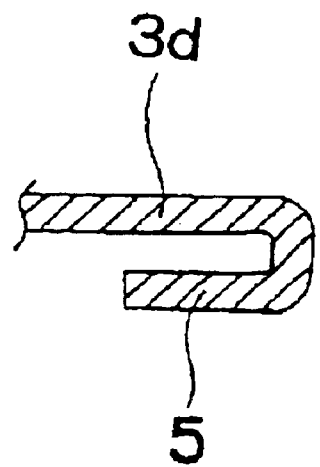
Figure 4:
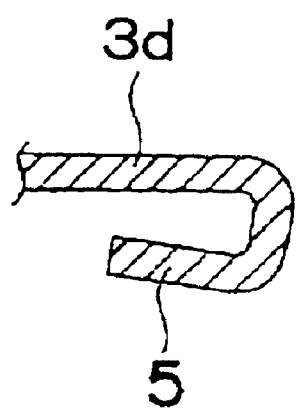

The folded portion 5 may be positioned nearly parallel to the side section 3d as shown in FIGS. 4(a) and 4(c). Alternatively, the folded portion 5 may be positioned oblique in relation to the side section 3d as shown in FIGS. 4(b) and 4(d). The folded portions 5 may be different in radius of folding from each other as will be seen from FIG. 4(a). Also, the folded portion 5 may be in close contact with the side section 3d as shown in FIG. 4(a), be in partial close contact with the side section 3d as shown in FIG. 4(b), or be off the side section 3d as shown in FIGS. 4(c) and 4(d).

In the frame member according to the present invention, the rear section 3a and pair of inclined sections 3b define together the structure having a generally C-like vertical cross section, and the front section 3c contiguous to the inclined section 3b and the side section 3d define together the structure having a generally L-like vertical cross-section, as described above. Further, the depressions 4 formed in the front sections 3c and the folded portions 5 of the side sections 3d contribute to improved strength and rigidity of the frame member A as a whole, whereby it is possible to work the frame member A with a high precision. Owing to the above design, the frame member A can be formed from an elongated rectangular steel plate having a reduced thickness to provide a lighter one.

In the embodiment of the frame member shown in FIG. 2, one L-shaped structure is provided on either side of the C-shaped structure, and the two C-shaped structures are generally symmetric with respect to the C-shaped structure. In the other embodiment shown in FIG. 3, two C-shaped structures are connected to each other by the front section 3c and two L-shaped structures are formed across the two C-shaped structures thus connected to each other.

The side sections 3d in pair should desirably be laid generally symmetrically with respect to the concavity 3. In the embodiment shown in FIG. 3, each of the side sections 3d extends contiguously to the front section 3c at an angle of about 90 deg. and thus the side sections 3d are parallel to each other with the concavities 3 being disposed between them. However, the side section 3d may be positioned at an angle other than 90 deg. with the front section 3c. Namely, the side sections 3d may not be parallel to each other with the concavities 3 being disposed between them.

Also, all the bent joints or boundaries between the adjacent ones of the rear section 3a, inclined sections 3b, front sections 3c and side sections 3d forming together the frame member A according to the present invention should preferably be rounded to assure the safety of the workers handling the frame member A.

Further, to prevent water or the like from staying inside the concavity or concavities 3 and other concavities defined by the inclined section 3b, front section 3c and side section 3d, the bent joints should preferably have formed therein through-holes 6 through which water or the like can be drained.

The through-hole 3 is generally elliptic in shape, for example, to smoothly drain water or the like. It is positioned longitudinally of the frame member A and is sized not to reduce the strength of the frame member A itself. It should be noted that the through-hole 6 may be formed in each of the bent joints of the frame member A or solely in each of the bent joints which will be lower when the frame member A is used. Also note that the through-hole 6 should desirably be laid dispersedly longitudinally of the frame member A to evenly drain water or the like and avoid concentration of the stress to the through-hole 6.

Next, the traveling frame assembly formed from the frame member A according to the present invention will be described herebelow.

Figure 5:
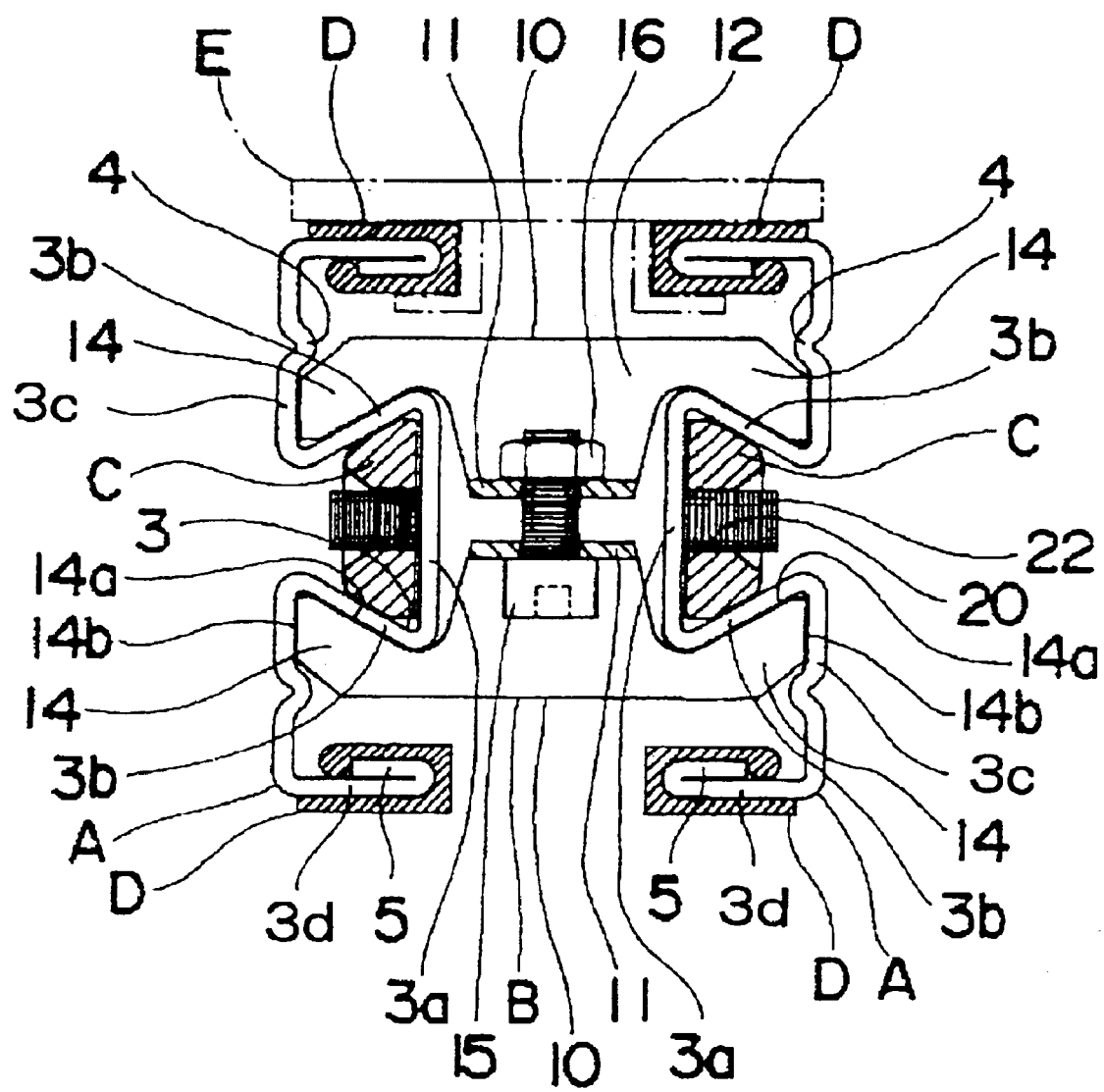
FIG. 5 is a partially cut-away front view of one embodiment of the traveling frame assembly according to the present invention.
Figure 6:
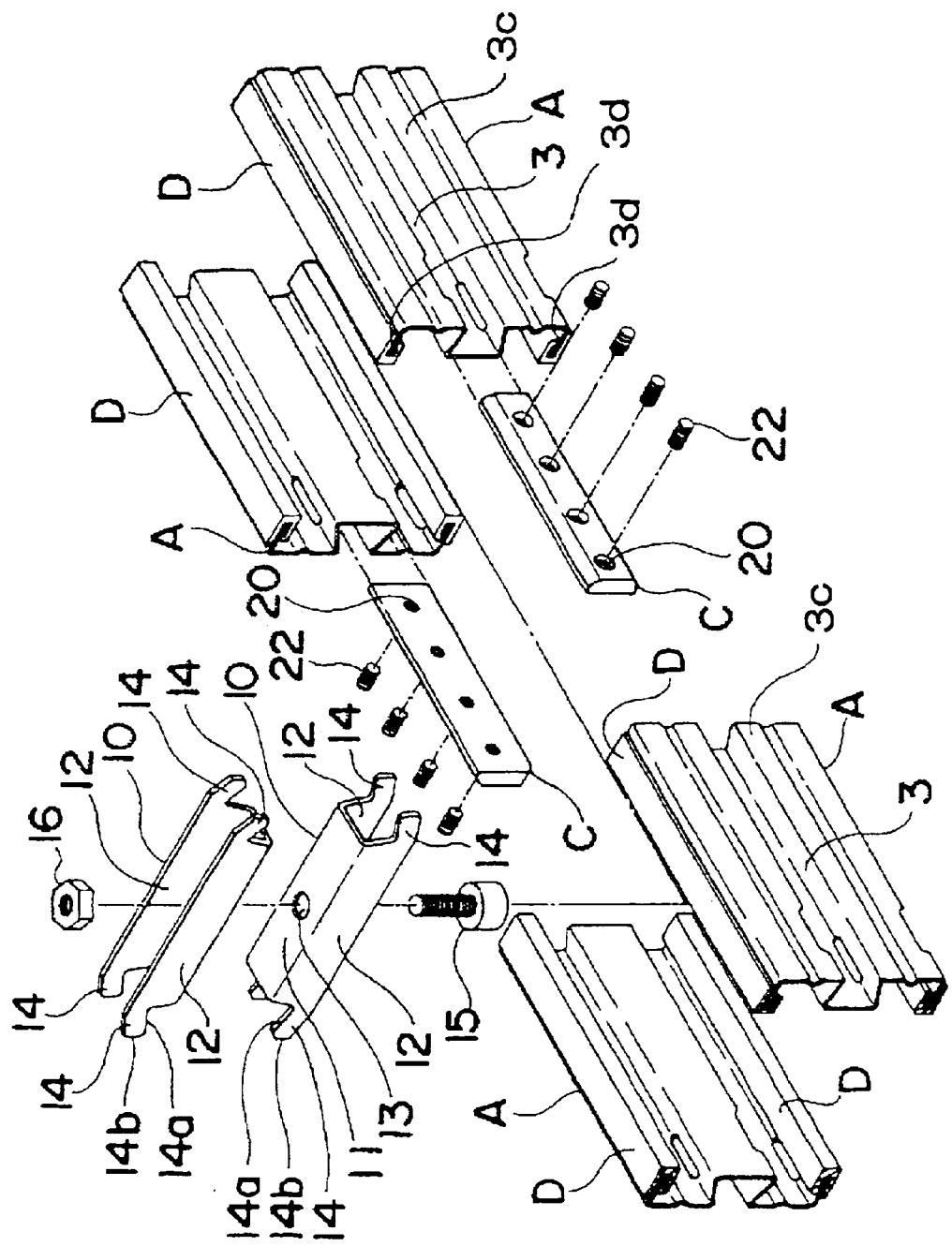
FIG. 6 is an exploded perspective view of the traveling frame assembly in FIG. 5.

The traveling frame assembly is usable with a conveyor chain or the like (indicated with a reference E) used in a conveyor system. As shown in FIGS. 5 and 6, the traveling frame assembly includes a pair of metallic frame members A and an appropriate number of coupling clamps B to couple the pair of frame members A to each other in parallel to each other. Each coupling clamp B includes a pair of clamp bodies 10 and a fastener to couple the clamp bodies 10 and fasten them towards each other. Each of the clamp bodies 10 in pair has provided at either free end thereof an engagement portion 14 shaped to catch each of the rear sections 3a of the frame members A in pair.

Further, in the traveling frame assembly, there is provided a joint member C which can be inserted in the longitudinal concavity 3 and has a plurality of internally threaded holes 20 formed therein. The joint member C is secured in the longitudinal concavity 3 of the frame member A by tightening screws 22 in the internally threaded holes 20 in the joint member C to couple the mating frame members A with each other.

The clamp body 10 of the coupling clamp B consists of a base piece 11 formed from a rectangular plate having an insertion hole 13 formed in the center thereof, and a pair of rising pieces 12 formed contiguous at lateral ends of the base piece 11. Each of the rising pieces 12 in pair has formed at each end thereof an engagement portion 14 which can be engaged on the side section 3a (at the back of the concavity 3). The engagement portion 14 has an inclined edge 14a which abuts the inclined section 3b defining the concavity 3, and an end 14b which abuts the front section 3c.

More specifically, for assembling the traveling frame assembly, the pair of clamp bodies 10 is set in place in relation to the frame members A with the inclined edges 14a of the engagement portions 14 being set to abut the pair of inclined sections 3b of the frame member A, and the joint members C are set in place in the concavities 3 of the frame members A. When the fastener is tightened, the inclined edges 14a of the engagement portions 14 of the clamp bodies 10 will force the pair of inclined sections 3b of the frame members A to move the frame members A towards each other until the front sections 3c abut the ends 14b of the engagement portion 14. Thus, the clamp bodies 10 themselves serve as a spacer to keep the pair of frame members A spaced a predetermined distance from each other by the ends 14b of the engagement portion 14.

Note that the clamp body 10 is designed such that when the pair of inclined sections 3b is forced by the inclined edges 14a to move the pair of frame members A towards each other, the base piece 11 and rising piece 12 of the clamp body 10 will not abut the rear section 3a and the other, namely, the front section 3c will not abut the end 14b.

Also, the intermediate portion between the inclined edge 14a and end 14b of the engagement portion 14 is shaped to provide some space at the corner formed by the front section 3c and inclined section 3b of the frame member A. The space is provided to allow free flow of any water or dust at the corner formed by the front section 3c and inclined section 3b.

Figure 8:
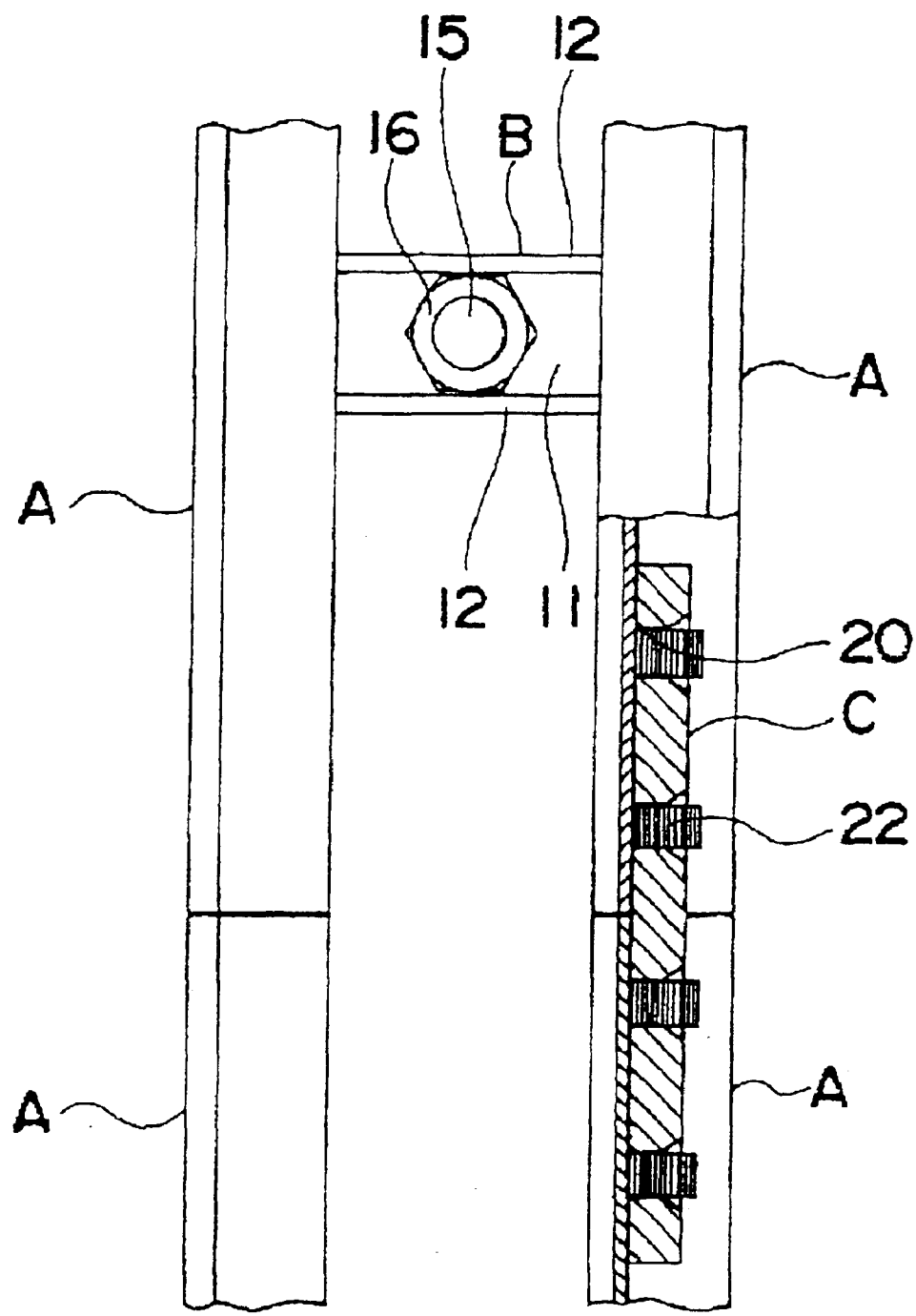
FIG. 8 is a partially cut-away plan view of the traveling frame member in FIG. 5.

The aforementioned fastener includes a bolt 15 which can be inserted through the insertion hole 13 in the clamp body 10 (hex. socket head bolt, for example) and a nut 16. It may be any one which could securely couple the pair of clamp bodies 10 and force the latter towards each other. It should be noted that the nut 16 may be a one which can be received between the pair of rising pieces 12 of the clamp body 10 and thus blocked against rotation by the rising pieces 12 as will be seen from FIG. 8.

The joint member C is formed from a thick metal plate, for example. The joint member C has a plurality (four pieces, for example) of internally threaded holes 20 formed at predetermined intervals along the length of the joint member C. The joint member C is shaped to have a cross section which nearly fits the profile of the concavity 3 defined by the rear section 3a and inclined sections 3b. More specifically, when the joint member C is placed in contact with the rear section 3a, its lateral edges are in contact with the inclined sections 3b in pair as shown in FIG. 5. When screws 22 in the internally threaded holes 20 are tightened with the joint member C being set in place in the concavity 3, the inner ends of the screws 22 will press the rear section 3a, the joint member C will be secured to the frame member A with the joint member C being in close contact at the inclined lateral surfaces thereof with the inclined sections 3b, and thus the neighboring frame members A will be coupled to each other accurately and positively. Also, the joint member C is shaped to some space at the corner defined by the front section 3c and inclined section 3b of the frame member A. Namely, the space is provided to allow free flow of any water or dust nearly at the corner formed by the front section 3c and inclined section 3b.

Figure 7:
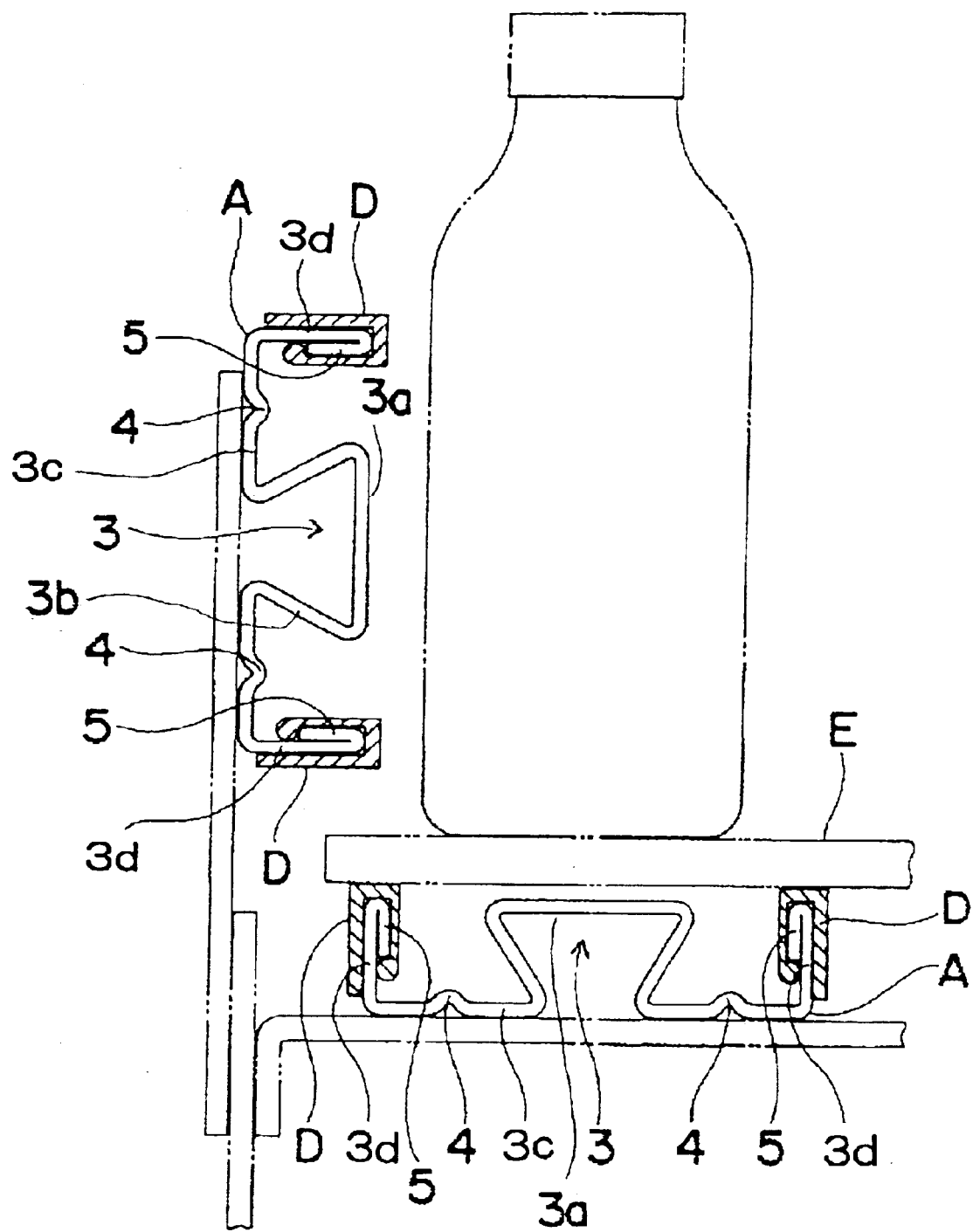
FIG. 7 is a front view of the frame member employed in the present invention, showing an example of application.

Next, example, applications of the frame member A according to the present invention will be described herebelow. First of all, the frame member A is usable as members of the traveling frame assembly as shown in FIG. 5, and also as a guide rail or as a receiving rail to receive a conveyor chain E in a conveyor system as shown in FIG. 7. It should be noted here that the frame member A can be used in other than the conveyor systems.

The traveling rail fixing mechanisms according to the present invention will be described herebelow with reference to FIGS. 9 to 15. The traveling rail fixing mechanisms are intended to install a synthetic resin-made traveling rail D simply, positively, correctly, smoothly and stably to an end portion (traveling-rail receiving portion) of the side section 3d of a metallic (or synthetic resin-made) frame member A in a traveling rail assembly (see FIG. 11) which is in smooth contact with a conveyor chain E, guide rail (see FIG. 12) which is in smooth contact with an article to be conveyed or receiving rail (also see FIG. 12) which is in smooth contact with the conveyor chain E, in a conveyor system.

Figure 9:
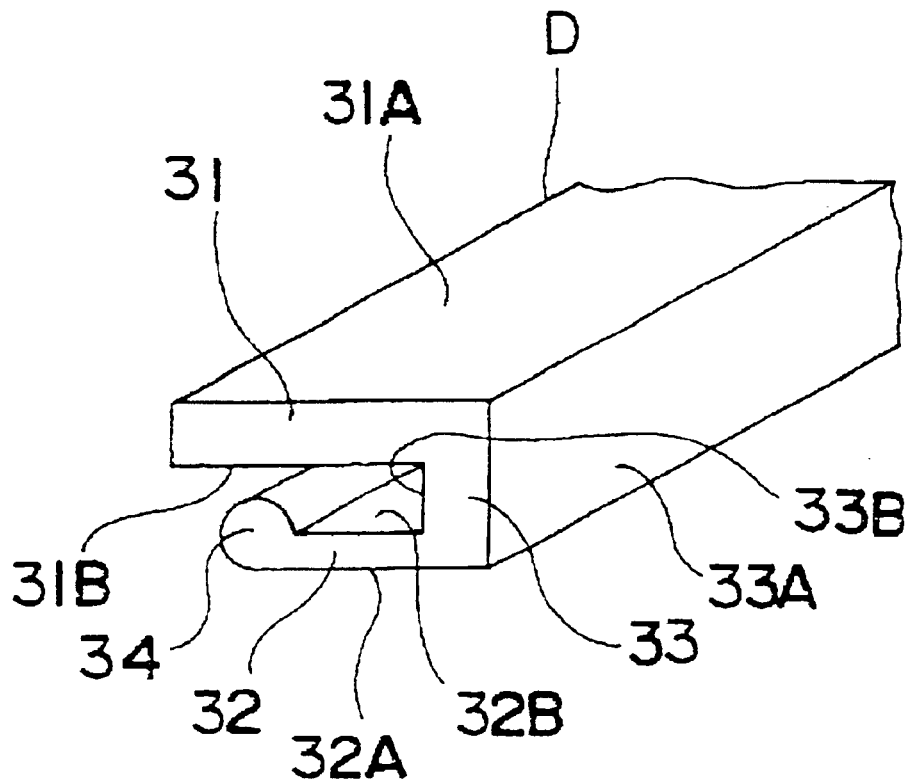
FIG. 9 is a fragmentary sectional view of the frame member with a traveling rail according to the present invention.
Figure 10:
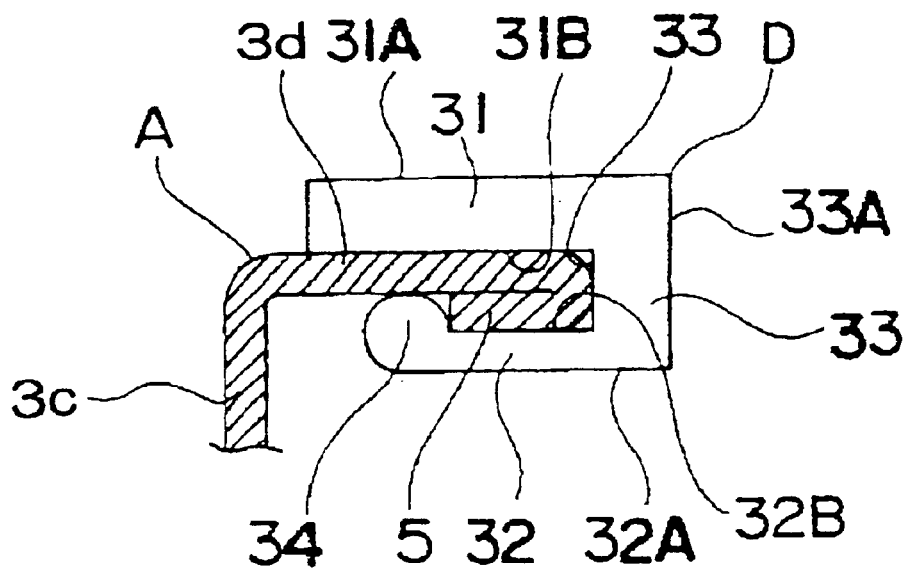
FIG. 10 is also a fragmentary cross sectional view of the frame member with a traveling rail according to the present invention.

The traveling rail D used in such traveling rail fixing mechanisms is formed as a unit from a synthetic resin having an appropriate elasticity. The traveling rail D is fixed to the frame member A to cover the folded portion 5 and fixed of the side section 3d. The traveling rail D is in contact with the conveyor chain E and an article to be conveyed to assure a smooth movement of them. More specifically, the traveling rail D consists of a base piece 31 which is a relatively thick, elongated strip-shaped plate, an elongated strip-shaped catching piece 32 parallel to, and with a predetermined space from, the base piece 31, and an elongated strip-shaped side piece 33 formed contiguous to, and at an angle of about 90 deg. with, the base piece 31 and catching piece 32. Thus, the traveling rail D has a recess defined by the base piece 31, catching piece 32 and side piece 33. Further, the catching piece 32 is extended by an engagement projection 34 protruding towards the base piece 31 as shown in FIGS. 9 and 10.

When the traveling rail D is fitted on the traveling-rail receiving portion of the frame member A, the inner wall 31B of the base piece 31 of the traveling rail D abuts the side section 3d of the frame member A, the inner wall 33B of the side piece 33 of the traveling rail D abuts the bent joint between the side section 3d and folded portion 5 of the frame member A, the inner wall 32B of the catching piece 32 of the traveling rail D abuts the folded portion 5 of the frame member A, and the engagement projection 34 of the traveling rail D engages the end of the folded portion 5 of the frame member A.

More particularly, the traveling rail D is fitted to the traveling-rail receiving portion of the frame member A to enclose the end portion of the side section 3d. The traveling rail D will be blocked against movement in the widthwise direction of the side section 3d and in a direction perpendicular to the side section 3d. Thus the traveling rail D can be fixed to the frame member A correctly and stably.

Note that the traveling rail D may be designed to force the side section 3d of the frame member A by the base piece 31 and engagement projection 34 thereof under its own elasticity or to force the side section 3d and folded portion 5 of the frame member A by the base piece 31 and catching piece 32. Also, the traveling rail D may be other than the one which is elastic as above.

Further, the traveling rail D may be designed so that in case it is formed such that it can be fixed more stably to the traveling-rail receiving portion of the frame member A with the inner wall 31B of the base piece 31 of the traveling rail D being in close contact with the side section 3d of the frame member A and the inner wall 32B of the catching piece 32 of the traveling rail D being in close contact with the folded portion 5 of the frame member A, the inner wall 33B of the side piece 33 of the traveling rail D will abut the bent joint between the side section 3d and folded portion 5 of the frame member A to block the traveling rail D against movement in the direction of the width of the side section 3d or the inner wall 33B of the side piece 33 of the traveling rail D will be a little off the bent joint between the side section 3d and folded portion 5 of the frame member A (not shown).

The base piece 31 is shaped, for example, so that the bottoms of the right and left end portions of the conveyor chain E will be in sliding contact with the outer wall 31A of the base piece 31 while the inner wall 31B will be in close contact with or abut the outer wall of the side section 3d of the frame member A.

The catching piece 32 is shaped to have a smaller thickness and width than the base piece 31, for example. In addition, the catching piece 31 is formed for the outer wall 32A thereof to be parallel to the outer wall 31A of the base piece 31 and for the inner wall 32B to be in close contact or abut the outer wall of the folded portion 5 of the frame member A.

Further, the side piece 33 is formed for the outer wall 33A thereof to be at right angles with the outer wall 31A of the base piece 31 and for the inner wall 33B thereof to abut the outer surface of the bent joint between the side section 3d and folded portion 5 of the frame member A, for example. It should be noted that the outer wall 33A of the side piece 33 may be inclined to form an acute angle with the outer wall 31A of the base piece 31 correspondingly to the shape of the conveyor chain E (see FIG. 13(c)) or it may be curved to be outwardly convex (see FIG. 13(d)). Also, the inner wall 33B of the side piece 33 may be concavely curved for close contact with the outer surface of the bent joint between the side section 3d and folded portion 5 of the frame member A in order to attain a more stable installation of the traveling rail D (see FIG. 14(b)), or small circular cuts may be formed in the corner between the inner wall 31B of the base piece 31 and inner wall 33B of the side piece 33 and in that between the inner wall 32B of the catching piece 32 and inner wall 33B of the side piece 33 in order to provide a large elastic deformation of the traveling rail D (see FIG. 14(a)).

The engagement projection 34 is a generally circular one (as shown in FIGS. 13(c) and 13(d)), a generally trapezoidal one (as shown in FIG. 13(a)) or a generally triangular one (as shown in FIG. 13(b)), which abuts (or is in close contact with) the inner wall of the side section 3d and end of the folded portion 5. That is, the engagement projection 34 is so shaped as to easily move over the folded portion 5 when the traveling rail D is fitted onto, or detached from, the traveling-rail receiving portion of the frame member A. It should be noted that the engagement projection 34 may be shaped correspondingly to the shape of the end of the folded portion 5. For example, when the end of the folded portion 5 is shaped to be inclined, the engagement projection 34 may be shaped generally like a hook corresponding to the inclination (not shown).

Further, FIGS. 15(a) to 15(d) show further variants of the traveling rail fixing mechanism according to the present invention. In these variants, the traveling rail D is formed as a unit from a synthetic resin having an appropriate elasticity. The traveling rail D consists of a base piece 31 which is an elongated strip-shaped plate, an elongated strip-shaped catching piece 32 spaced a predetermined distance from the base piece 31, and an elongated strip-shaped side piece 33 formed contiguous to the base piece 31 and catching piece 32. Thus, the traveling rail D has a recess defined by the base piece 31, catching piece 32 and side piece 33. Further, the catching piece 32 is extended by an engagement projection 34 protruding towards the base piece 31 as shown in FIGS. 15(a) and 15(b). Alternatively, the base piece 31 has formed at the free end thereof an engagement projection 34 protruding towards the catching piece 32 as shown in FIG. 15(c). Still alternatively, the base piece 31 has formed at the free end thereof an engagement projection 34 protruding towards the catching piece 32 while the catching piece 32 is extended by another engagement projection 34 protruding towards the base piece 31, as shown in FIG. 15(d). It should be noted here that the location of the engagement projection 34 is not limited to the free end of the base piece 31 and/or catching piece 32. Also note that the shape (sectional) of the engagement projection 34 is not limited to a generally circular one as shown.

Figure 15:
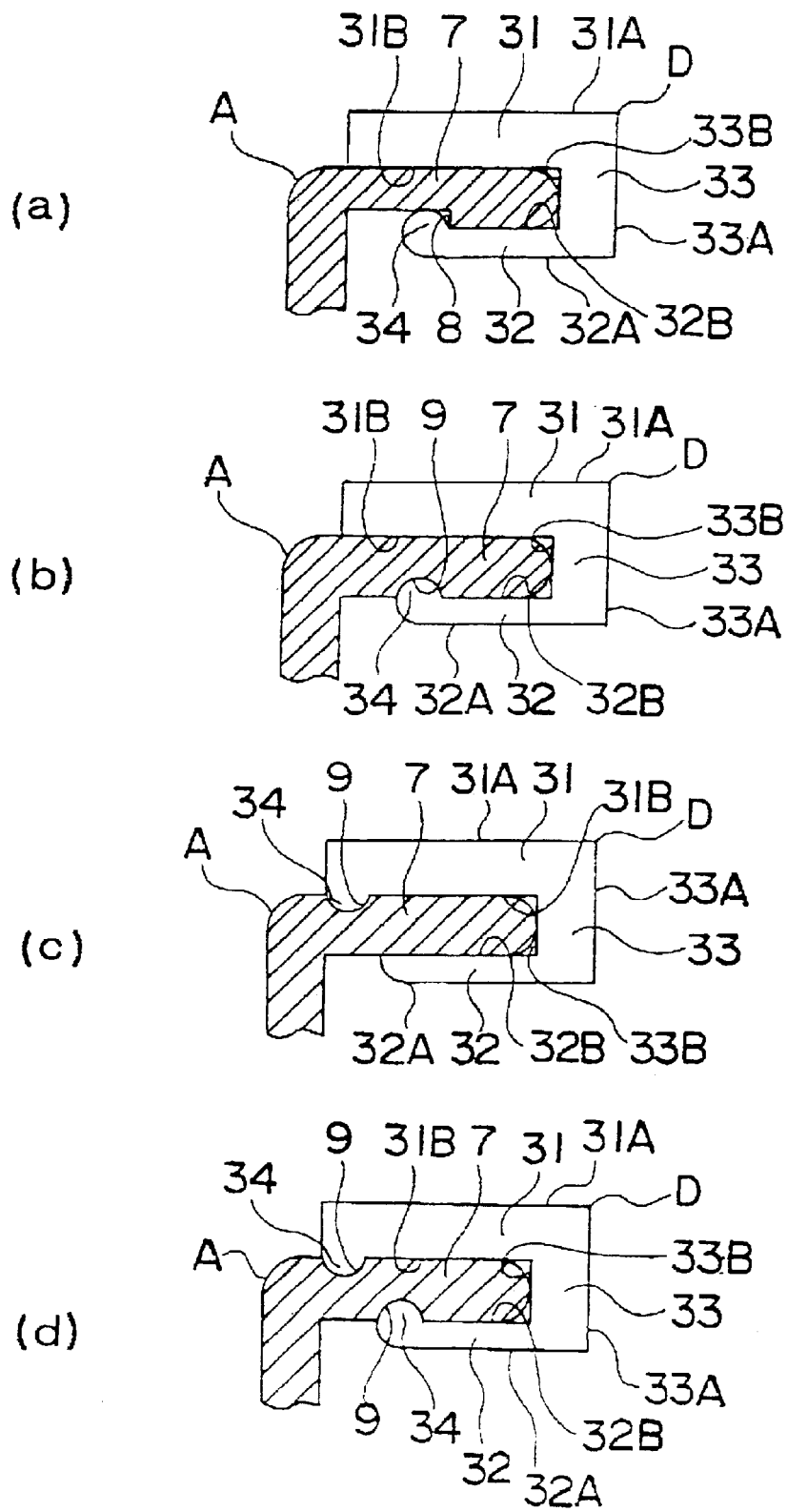
FIGS. 15(a) to 15(d) are also partial sectional views of further variants of the frame member with a traveling rail according to the present invention.
Figure 16:
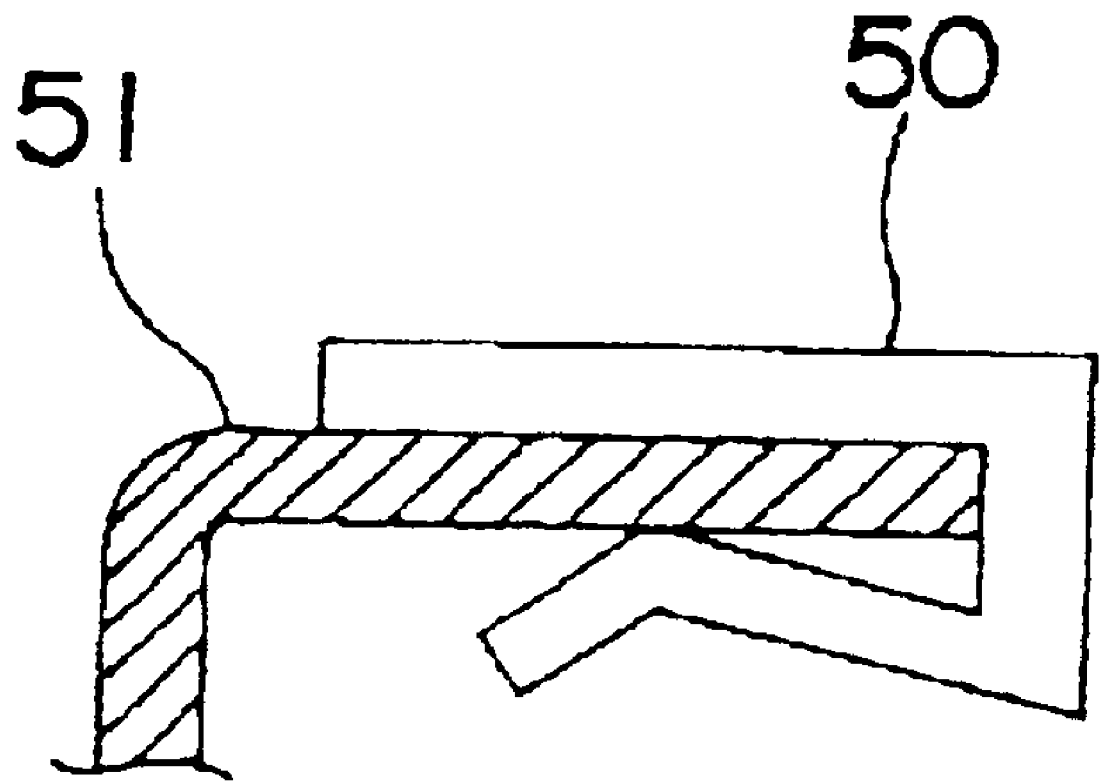
FIG. 16 is a partial sectional view of an example of the conventional frame member with a traveling rail.

On the other hand, the frame member A on which the traveling rail D is to be fixed is formed from aluminum by extrusion molding for example. The traveling-rail receiving portion formed at the end (side section 3d) of the frame member is formed from an elongated strip-shaped fixing base piece 7 formed contiguous to, and at an angle of about 90 deg. with, the base plate thereof as shown in FIG. 15.

The traveling rail D and frame member A may be shaped for the inner wall 31B of the base piece 31 thereof to abut the surface of the top of the fixing base piece 7, the inner wall 33B of the side piece 33 to abut the free end of the fixing base piece 7, the inner wall 32B of the catching piece 32 to abut the bottom of the fixing base piece 7, and for an engagement projection 34 at the end of the catching piece 32 to be engaged on an engagement step 8 formed on the fixing base piece 7 (as shown in FIG. 15(a)), an engagement projection 34 at the end of the catching piece 32 to be engaged in a generally circular engagement concavity 9 formed in the bottom of the fixing base piece 7 (as shown in FIG. 15(b)), an engagement projection 34 formed at the end of the base piece 31 of the traveling rail D to be engaged in a generally circular engagement concavity 9 formed in the bottom of the fixing base piece 7 (as shown in FIG. 15(c)) or for an engagement projection 34 formed at the end of the base piece 31 of the traveling rail D to be engaged in a generally circular engagement concavity 9 formed in the bottom of the fixing base piece 7 while an engagement projection 34 at the end of the catching piece 32 is engaged in a generally circular engagement concavity 9 formed in the bottom of the fixing base piece 7 (as shown in FIG. 15(d)).

It should be noted that the traveling rail D and frame member A may also be shaped for the inner wall 33B of the side piece 33 of the traveling rail D to abut the end of the fixing base piece 7 to immobilize the traveling rail D in the direction of the width of the fixing base piece 7 or for the inner wall 33B of the side piece 33 of the traveling rail D to be a little off the end of the fixing base piece 7 of the frame member A (both not shown).

Figure 11:
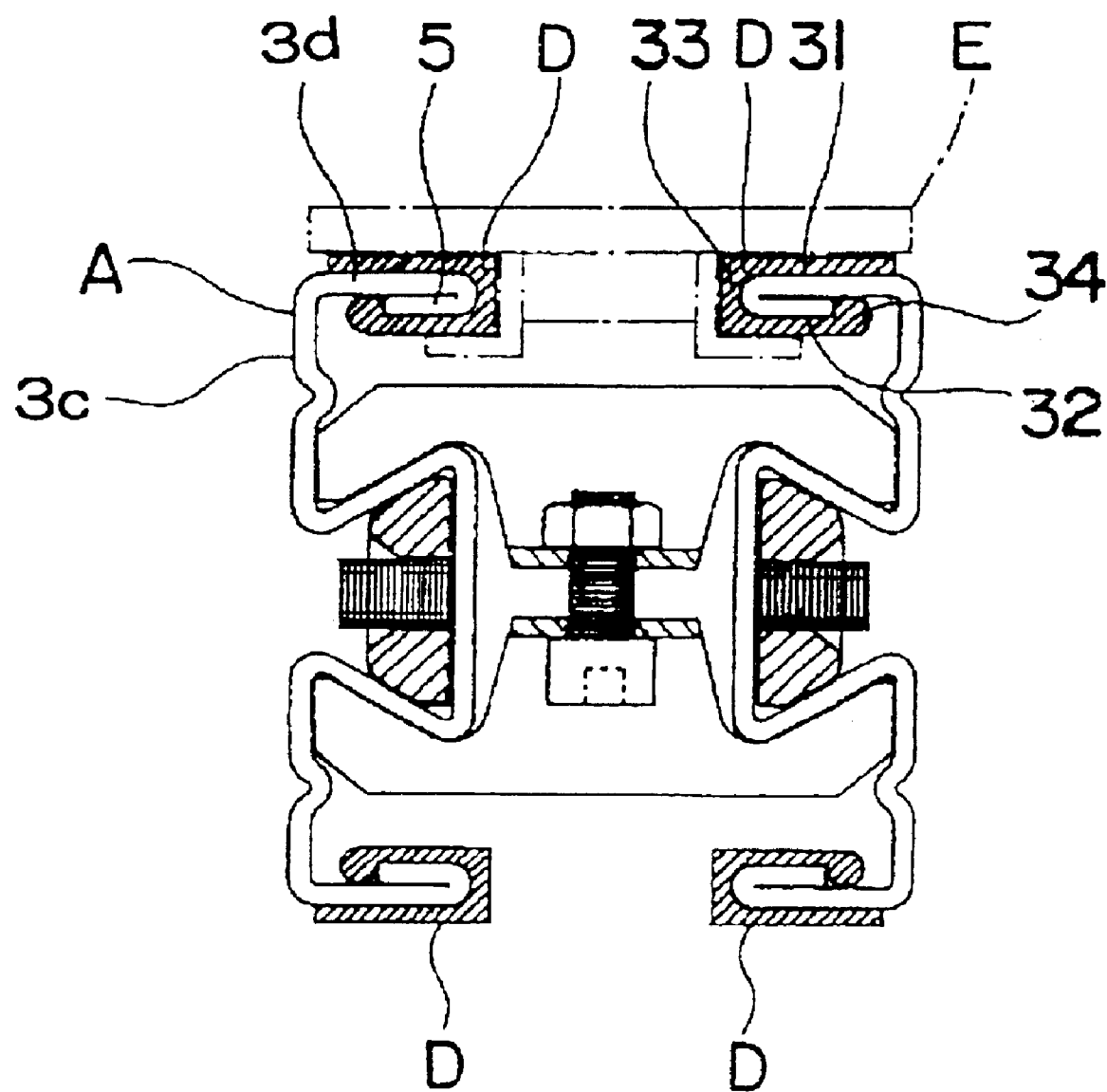
FIG. 11 is a partially cut-away front view of the frame member with a traveling rail according to the present invention, showing an example of application.
Figure 12:
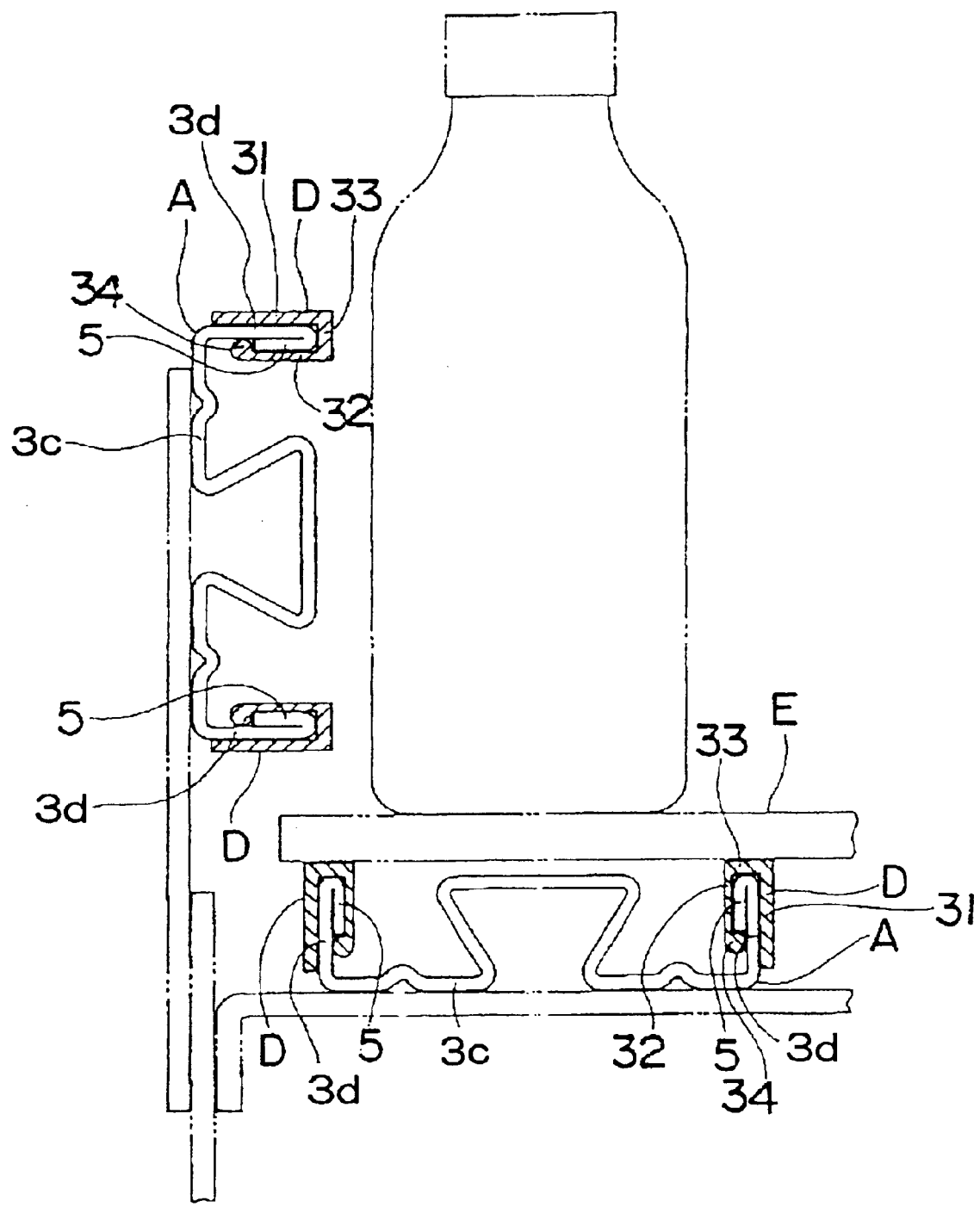
FIG. 12 is also a partially cut-away front view of the frame member with a traveling rail according to the present invention.
Figure 13:
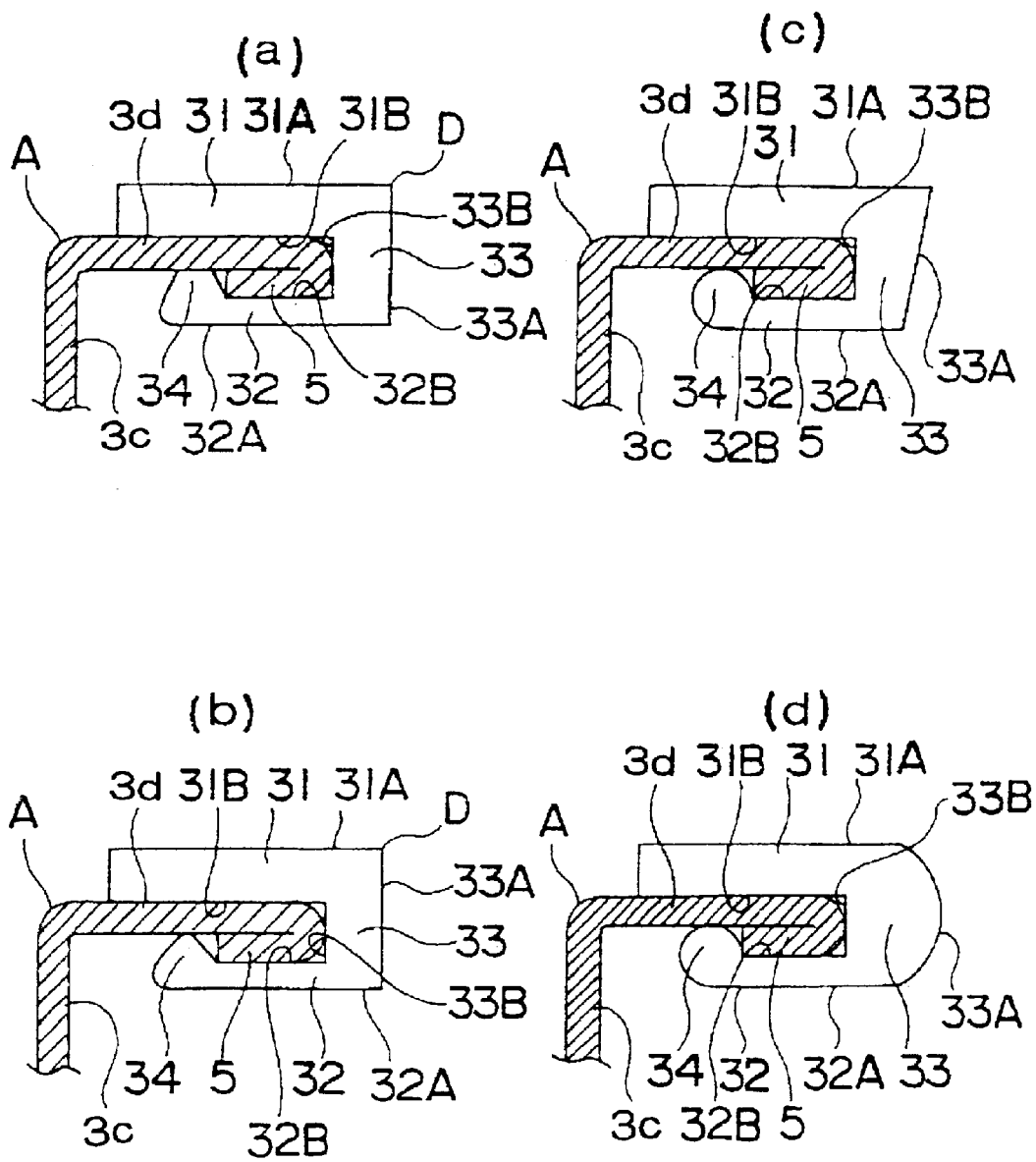
FIGS. 13(a) to 13(d) are partial sectional views of variants of the frame member with a traveling rail according to the present invention.
Figure 14:
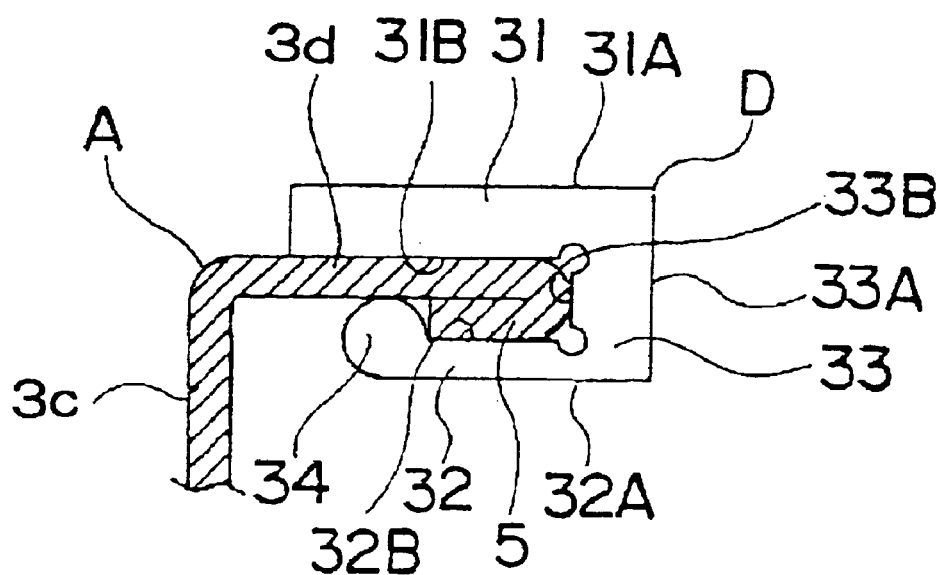
FIGS. 14(a) and 14(b) are partial sectional views of other variants of the frame member with a traveling rail according to the present invention.
Figure 14:
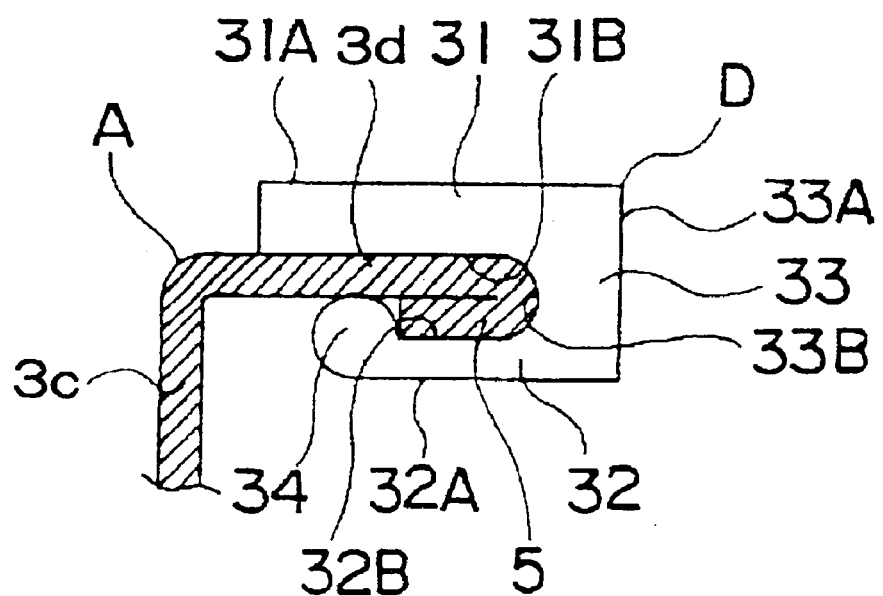

Next, the applications of the traveling rail fixing mechanism according to the present invention will be described herebelow. When the frame member A is used as a guide rail in a conveyor system as shown in FIG. 12, as a receiving rail to receive a conveyor chain E or as a member of a traveling rail assembly as shown in FIG. 11, the traveling rail D is fitted on the end portion of the side section of each frame member A. The traveling rail D, having been abraded or damaged, can be detected from the frame member A for replacement. It should be noted that the traveling rail fixing mechanism is utilizable in any field other than the industry of conveyor system.

Further, for fixing the traveling rail D to the traveling-rail receiving portion of the frame member A, the opening between the end of the base piece 31 and inner end (or engagement projection 34) of the catching piece 32 may be set to face the bent joint between the side section 31d and folded portion 5 of the frame member A and then the side piece 33 of the traveling rail D be forcibly pushed towards the front section of the frame member A until the engagement projection 34 is engaged on the inner end of the folded portion 5, or the traveling rail D may be longitudinally fitted at the longitudinal end thereof onto the side section 31d of the frame member A at the longitudinal end of the latter.

INDUSTRIAL APPLICABILITY

As having been described in the foregoing, since the frame member as a whole can have an improved strength and rigidity even if each of the rear section, inclined sections, front sections and side sections thereof are formed relatively thin, it is usable as a one which is lightweight and high in precision of working. It can thus be simple in construction, suitable for mass production and thus can be produced at low costs. Particularly, the frame member can be usefully applied in various types of conveyor systems.

What is claimed is:

1. A metallic frame member having fitted thereon a plastic traveling rail usable in a traveling frame assembly, guide rail, or receiving rail in a conveyor system, the frame member comprising:

a rear section extending longitudinally of the frame member;

a pair of inclined sections contiguous to lateral ends of the rear section and extending in converging directions away from the rear section;

a pair of front sections contiguous to lateral ends of the inclined sections and extending in directions generally parallel to the rear section; and a pair of side sections continuous to lateral ends of the front sections and extending in parallel directions towards the plane of the rear section;

the rear section and pair of inclined sections defining together a longitudinal concavity having a generally C-like vertical cross-section; and each of the side sections being folded back at the free end inside or outside thereof, wherein there are provided through-holes formed in the bent joint between the rear section and inclined section, that between the inclined section and front section and that between the front section and side section of the frame member, respectively;

the traveling rail comprising a base piece, a catching piece opposite to, and with a predetermined space from the base piece, and a side piece contiguous to and joining the base piece and catching piece to each other at their ends, these pieces defining together a recess between them, and having formed at the free end thereof an engagement protection protruded towards the base piece, the traveling rail being fixed to the frame member with the inner wall of the base piece being put in abutment on the side section of the frame member, inner wall of the catching piece being put in abutment on the folded portion of the side section of the frame member and with the engagement projection being engaged on the end of the folded portion of the side section of the frame member.

2. A traveling frame assembly for use with a conveyor chain in a conveyor system, including a pair of metallic frame members and a coupling clamp to couple the pair of frame members in parallel and opposite to each other, each of the frame members comprising:

a rear section extending longitudinally of the frame member;

a pair of inclined sections contiguous to lateral ends of the rear section and extending in converging directions away from the rear section;

a pair of front sections continuous to lateral ends of the inclined sections and extending in directions generally parallel to the rear section; and a pair of side sections continuous to lateral ends of the front sections and extending in parallel directions towards the plane of the rear section;

the rear section and pair of inclined sections defining together a longitudinal concavity having a generally C-like vertical cross-sectional profile;

the coupling clamp including a pair of clamp bodies and a fastener to couple the clamp bodies and fasten them towards each other; and each of the pair of clamp bodies having provided at either free end thereof an engagement portion shaped to catch each of the rear sections of the frame members.

3. The traveling frame assembly according to claim 2, wherein there is provided a joint member which can be inserted in the longitudinal concavity defined by the rear section and opposite inclined sections of the frame member and has a plurality of internally threaded holes formed therein, and the joint member can be secured in the longitudinal concavity of the frame member by screws in the internally threaded holes in the joint member.

4. A metallic frame member having fitted thereon a plastic traveling rail usable in a traveling frame assembly, guide rail, or receiving rail in a conveyor system, the frame member comprising:

a rear section extending longitudinally of the frame member;

a pair of inclined sections contiguous to lateral ends of the rear section and extending in converging directions away from the rear section;

a pair of front sections contiguous to lateral ends of the inclined sections and extending in directions generally parallel to the rear section; and a pair of side sections contiguous to lateral ends of the front sections and extending in parallel directions towards the plane of the rear section;

the rear section and pair of inclined sections defining together a longitudinal concavity having a generally C-like vertical cross-section; and each of the side sections being folded back at the free end inside or outside thereof;

the traveling rail comprising a base piece, a catching piece opposite to, and with a predetermined space from the base piece, and a side piece contiguous to and joining the base piece and catching piece to each other at their ends, these pieces defining together a recess between them, and having formed at the free end thereof an engagement projection protruded towards the base piece, the traveling rail being fixed to the frame member with the inner wall of the base piece being put in abutment on the side section of the frame member, inner wall of the catching piece being put in abutment on the folded portion of the side section of the frame member and with the engagement projection being engaged on the end of the folded portion of the side section of the frame member, wherein there is provided a joint member which can be inserted in the longitudinal concavity defined by the rear section and opposite inclined sections of the metallic frame member and has a plurality of internally threaded holes formed therein, and the joint member is secured in the longitudinal concavity of the metallic frame members by screws in the internally threaded hole in the joint member, and the metallic frame members are connected to each other rigidly in the longitudinal direction.

5. A metallic frame member having fitted thereon a plastic traveling rail usable in a traveling frame assembly, guide rail, or receiving rail in a conveyor system, the frame member comprising:

a rear section extending longitudinally of the frame member;

a pair of inclined sections contiguous to lateral ends of the rear section and extending in converging directions away from the rear section;

a pair of front sections contiguous to lateral ends of the inclined sections and extending in directions generally parallel to the rear section; and a pair of side sections contiguous to lateral ends of the front sections and extending in parallel directions towards the plane of the rear section;

the rear section and pair of inclined sections defining together a longitudinal concavity having a generally C-like cross-sectional profile; and each of the side sections in pair being shaped at the free end thereof to be a step or to have a concavity for engagement with a traveling rail, wherein there are provide through-holes formed in the bent joint between the rear section and inclined section, that between the inclined section and front section and that between the front section and side section of the frame member, respectively;

the traveling rail comprising a base piece, a catching piece opposite to, and with a predetermined space from the base piece, and a side piece contiguous to and joining the base piece and catching piece to each other at their ends, these pieces defining together a recess between them, at least one of the base piece and catching piece having an engagement projection formed thereon while a traveling-rail receiving portion of the frame member, on which the tray ling rail is to be fitted, is formed from an elongated strip-shaped fixing base piece, and the traveling rail being designed so that the inner wall of the base piece is put in abutment on the fixing base piece, inner wall of the catching piece is put in abutment on the fixing base piece and the engagement projection is engaged on an engagement step or concavity formed on the fixing base piece.

6. A metallic frame member having fitted thereon a plastic traveling rail usable in a traveling frame assembly, guide rail, or receiving rail in a conveyor system, the frame member comprising:

a rear section extending longitudinally of the frame member;

a pair of inclined sections contiguous to lateral ends of the inclined sections and extending in converging directions away from the rear section;

a pair of front sections contiguous to lateral ends of the inclined sections and extending in directions generally parallel to the rear section; and a pair of side sections contiguous to lateral ends of the front sections and extending in parallel directions towards the plane of the rear section;

the rear section and pair of inclined sections defining together a longitudinal concavity having a generally C-like cross-sectional profile; and each of the side sections in pair being shaped at the free end thereof to be a step or to have a concavity for engagement with a traveling rail, the traveling rail comprising a base piece, a catching piece opposite to, and with a predetermined space from the base piece, and a side piece contiguous to and joining the base piece and catching piece to each other at their ends, these pieces defining together a recess between them, at least one of the base piece and catching piece having an engagement projection formed thereon while a traveling-rail receiving portion of the frame member, on which the tray ling rail is to be fitted, is formed from an elongated strip-shaped fixing base piece, and the traveling rail being deigned so that the inner wall of the base piece is put in abutment on the fixing base piece, inner wall of the catching piece is put in abutment on the fixing base piece and the engagement projection is engaged on an engagement step or concavity formed on the fixing base piece, wherein there is provided joint member which can be inserted in the longitudinal concavity defined by the rear section and opposite inclined sections of the metallic frame member and has a plurality of internally threaded holes formed therein, and the joint member is secured in the longitudinal concavity of the metallic frame members by screws in the internally threaded hole in the joint member, and the metallic frame members are connected to each other rigidly in the longitudinal direction.

\* \* \* \* \*

UNITED STATES PATENT AND TRADEMARK OFFICE
CERTIFICATE OF CORRECTION

PATENT NO.    : 6,854,397 B2
DATED         : February 15, 2005
INVENTOR(S)   : A. Terajima et al.

It is certified that error appears in the above-identified patent and that said Letters Patent is hereby corrected as shown below:

<u>Title page,</u>
Item [57], ABSTRACT,
Line 2, after "member" insert -- is --.

<u>Column 17,</u>
Lines 4, 43 and 46, "continuous" should be -- contiguous --.

<u>Column 19,</u>
Line 1, "provide" should be -- provided --.

<u>Column 20,</u>
Line 17, "deigned" should be -- designed --.
Line 23, after "provided" insert -- a --.

Signed and Sealed this

Twenty-eighth Day of March, 2006

JON W. DUDAS
*Director of the United States Patent and Trademark Office*